United States Patent
Alesiani et al.

(10) Patent No.: US 11,822,577 B2
(45) Date of Patent: Nov. 21, 2023

(54) SYSTEMS AND METHODS FOR LEARNING HUMAN-UNDERSTANDABLE LOGICAL RULES FROM DATA

(71) Applicant: NEC Corporation, Tokyo (JP)

(72) Inventors: Francesco Alesiani, Heidelberg (DE); Markus Zopf, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/668,443

(22) Filed: Feb. 10, 2022

(65) Prior Publication Data

US 2023/0102602 A1    Mar. 30, 2023

Related U.S. Application Data

(60) Provisional application No. 63/248,611, filed on Sep. 27, 2021.

(51) Int. Cl.
  *G06F 16/28*  (2019.01)
  *G06N 3/04*  (2023.01)

(52) U.S. Cl.
  CPC ............ *G06F 16/284* (2019.01); *G06N 3/04* (2013.01)

(58) Field of Classification Search
  CPC .............................. G06F 16/284; G06N 3/04
  USPC ......................................................... 707/798
  See application file for complete search history.

(56) References Cited

U.S. PATENT DOCUMENTS

2003/0086536 A1*  5/2003  Salzberg ............ H04M 3/2263
                                                                    379/26.01
2014/0380266 A1* 12/2014  Bornhoevd ....... G06F 16/24532
                                                                    717/104
2019/0354689 A1* 11/2019  Li ............................ G06F 17/16
2020/0200548 A1    6/2020  Chawla
2021/0034928 A1*  2/2021  Oh ........................... G06F 18/10

FOREIGN PATENT DOCUMENTS

EP    3742345 A1    11/2020

OTHER PUBLICATIONS

Amizadeh et al.: "Manifest Index for Block-Level Snapshots", Published as a conference paper at ICLR 2019, Saeed Amizadeh, Sergiy Matusevych, Markus Weimer Microsoft Redmond, WA 98052 (hereafter "Amizadeh") (Year: 2019).*

(Continued)

*Primary Examiner* — Kuen S Lu
(74) *Attorney, Agent, or Firm* — Leydig, Voit & Mayer, Ltd.

(57) ABSTRACT

Systems and methods for learning and applying a rule set from relational data include receiving a graph representing relational data, wherein nodes represent elements of the graph, and edges represent relationships between nodes, generating an intermediate representation of the graph by mapping features of the nodes and edges of the graph to an intermediate vector representation, wherein the intermediate vector representation contains binary values and/or probabilistic values, learning logical rules that define the nodes and edges of the graph based on the intermediate vector representation r by: defining a maximum satisfiability (MAX-SAT) problem for the graph; and estimating a gradient around a solution of the MAX-SAT problem for the graph to produce the logical rules; and applying the logical rules to a new graph.

19 Claims, 25 Drawing Sheets

(56) References Cited

OTHER PUBLICATIONS

Ferber, et al., "MIPaaL: Mixed Integer Program as a Layer," *Proceedings of the AAAI Conference on Artificial Intelligence 34*, 2, pp. 1504-1511, Feb. 7-12, 2020, Association for the Advancement of Artificial Intelligence, Menlo Park, CA, USA.

Wang, et al., "SATNet: Bridging Deep Learning and Logical Reasoning Using a Differentiable Satisfiability Solver," *International Proceedings of the $3^{th}$ Conference on Machine Learning*, pp. 6545-6554, May 29, 2019, International Machine Learning Society Inc., Stroudsburg, PA, USA.

\* cited by examiner

SAT problem and SAT unit operator

- How we combine two feature vectors to build a SAT clause?
- Normal case $$\langle s, x \rangle = s^T x = \bigoplus_i s_i x_i$$

- Generalized inner product $$\langle x \mid S \mid y \rangle = x^T S y = \sum_{i,j} x_i \vee s_{ij} \vee y_j$$

Th: $x^T S y \to S = [s^-, s^+]$?

- Concatenation $$\langle x \mid S \mid y \rangle = \langle s^-, x \rangle \vee \langle s^+, y \rangle \qquad S = [s^-, s^+]$$

$$\langle x \mid S \mid y \rangle = \overline{\langle s^-, x \rangle} \wedge \langle s^+, y \rangle$$

De Morgan's laws
https://en.wikipedia.org/wiki/De_Morgan%27s_laws

FIG. 9

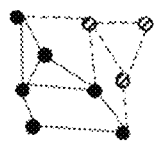
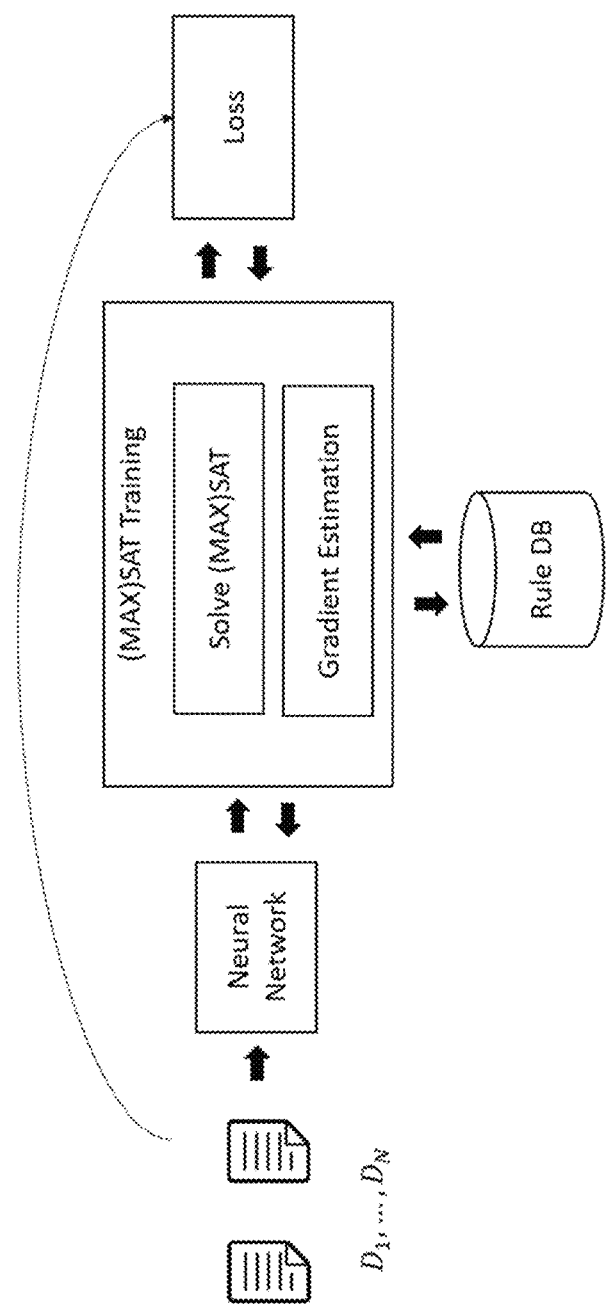
FIG. 17

SYSTEMS AND METHODS FOR LEARNING HUMAN-UNDERSTANDABLE LOGICAL RULES FROM DATA

CROSS-REFERENCES TO RELATED APPLICATIONS

The present application claims priority to U.S. Provisional Patent Application No. 63/248,611, filed Sep. 27, 2021, entitled "LEARNING HUMAN-UNDERSTANDABLE LOGICAL RULES FROM DATA," which is hereby incorporated by reference in its entirety herein.

FIELD

Embodiments of the present invention relate to Artificial Intelligence (AI) and Machine Learning (ML), and in particular to a method, system and computer-readable medium for learning human-understandable logical rules from data.

BACKGROUND

Graph-based machine learning has received increasing attention from the machine learning community since graph structures can be found in a wide range of application domains such as scientific citation graphs, social networks, and molecular structures. Today, the most popular approaches for graph-based machine learning are neural networks such as Graph Neural Networks (GNNs), Graph Convolutional Networks (GCNs), and Graph Attention Networks (GATs). While these approaches, and neural networks in general, have demonstrated great performance in all kinds of application domains including computer vision and natural language processing, they are often criticized for their limited high-level reasoning abilities.

In general, there is a need for improved approaches with better high-level reasoning for learning human understandable logical rules from data.

SUMMARY

According to an embodiment, the present disclosure provides a process for learning and applying a rule set from relational data, wherein the process involves receiving a graph representing relational data, wherein nodes represent elements of the graph, and edges represent relationships between nodes, generating an intermediate representation of the graph by mapping features of the nodes and edges of the graph to an intermediate vector representation, wherein the intermediate vector representation contains binary values and/or probabilistic values, learning logical rules that define the nodes and edges of the graph based on the intermediate vector representation r by: defining a maximum satisfiability (MAX-SAT) problem for the graph; and estimating a gradient around a solution of the MAX-SAT problem for the graph to produce the logical rules; and applying the logical rules to a new graph.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 9 illustrates a SAT operator over node features according to an embodiment;

FIG. 17 illustrates a training procedure around a SAT solution according to an embodiment;

DETAILED DESCRIPTION

Figure 1:
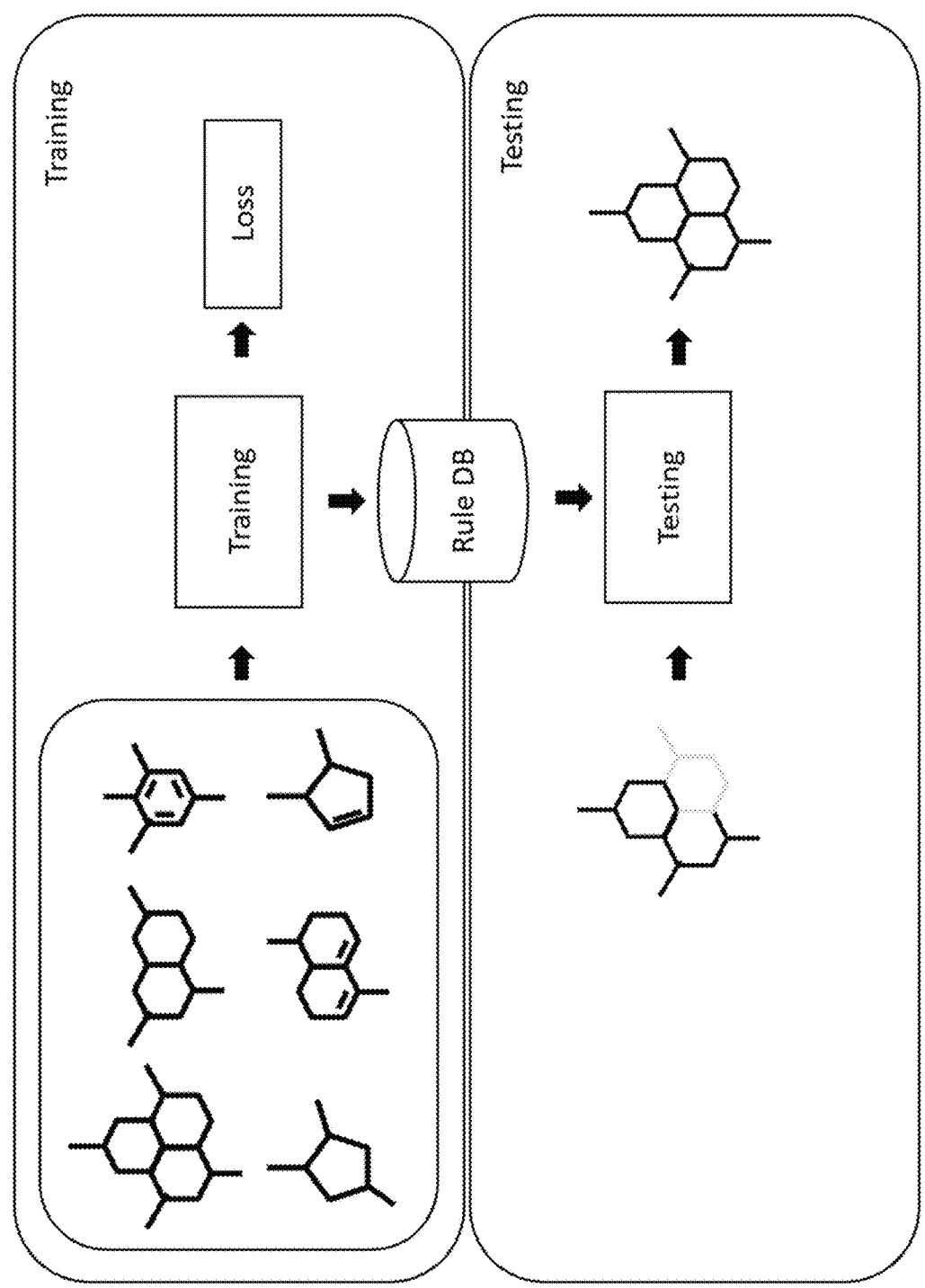
FIG. 1 illustrates an exemplary application of an exemplary embodiment of a method and system for learning logical rules that define relationships among elements of molecules.

Embodiments of the present disclosure provide Graph Reasoning Network (GRN) approaches that combine fixed and learned graph representations of data and a reasoning module based on a differentiable satisfiability solver According to an embodiment, a computer-implemented method of learning and applying a rule set from relational data is provided. The method may be implemented in a processor or processors connected to a memory. The method includes receiving a graph representing relational data, wherein nodes represent elements of the graph, and edges represent relationships between nodes, generating an intermediate representation of the graph by mapping features of the nodes and edges of the graph to an intermediate vector representation, wherein the intermediate vector representation contains binary values and/or probabilistic values, learning logical rules that define the nodes and edges of the graph based on the intermediate vector representation r by: defining a maximum satisfiability (MAX-SAT) problem for the graph; and estimating a gradient around a solution of the MAX-SAT problem for the graph to produce the logical rules; and applying the logical rules to a new graph.

According to an embodiment, a computer-implemented method of learning and applying a rule set from relational data is provided. The method may be implemented in a processor or processors connected to a memory. The method includes receiving a graph representing relational data, wherein nodes represent elements of the graph, and edges represent relationships between nodes, learning logical rules that define the nodes and edges of the graph by: defining a maximum satisfiability (MAX-SAT) problem for the graph; and estimating a gradient around a solution of the MAX-SAT problem for the graph to generate an intermediate representation of the graph by mapping features of the nodes and edges of the graph to an intermediate vector representation, wherein the intermediate vector representation contains binary values and/or probabilistic values and to produce the logical rules; and applying the logical rules to a new graph. According to an embodiment, a computing device configured for learning and applying a rule set from relational data is provided. The device includes one or more processors, and a memory storing instructions, wherein the instructions when executed by the one or more processors cause the network device to implement a method of learning and applying a rule set from relational data, where the method includes receiving a graph representing relational data, wherein nodes represent elements of the graph, and edges represent relationships between nodes, learning logical rules that define the nodes and edges of the graph by: defining a maximum satisfiability (MAX-SAT) problem for the graph; and estimating a gradient around a solution of the MAX-SAT problem for the graph to generate an intermediate representation of the graph by mapping features of the nodes and edges of the graph to an intermediate vector representation, wherein the intermediate vector representation contains binary values and/or probabilistic values and to produce the logical rules; and applying the logical rules to a new graph.

According to an embodiment, a computing device configured for learning and applying a rule set from relational data is provided. The device includes one or more processors, and a memory storing instructions, wherein the instructions when executed by the one or more processors cause the network device to implement a method of learning and applying a rule set from relational data, where the method includes receiving a graph representing relational data, wherein nodes represent elements of the graph, and edges represent relationships between nodes, generating an intermediate representation of the graph by mapping features of the nodes and edges of the graph to an intermediate vector representation, wherein the intermediate vector representation contains binary values and/or probabilistic values, learning logical rules that define the nodes and edges of the graph based on the intermediate vector representation r by: defining a maximum satisfiability (MAX-SAT) problem for the graph; and estimating a gradient around a solution of the MAX-SAT problem for the graph to produce the logical rules; and applying the logical rules to a new graph.

According to an embodiment, the receiving a graph includes receiving an input data set and building the graph from the input data set.

According to an embodiment, the input data set comprises text data, image data, video data, biological structure data or chemical structure data.

According to an embodiment, the new graph is a partial graph, and wherein the applying the logical rules to the new graph results in completed graph, or wherein the new graph is a whole graph, and the applying the logical rules to the new graph results in a validity check that the new graph satisfies the logical rules or an extraction of information from the whole graph.

According to an embodiment, the MAX-SAT problem is associated with the entire graph, or wherein the MAX-SAT problem is associated with the nodes of the graph, or wherein the MAX-SAT problem is associated with the edges of the graph.

According to an embodiment, the learning logical rules includes applying one or both of an Oracle training process to verify the logical rules or a consistency training process to verify consistency of the logical rules.

According to an embodiment, the estimating a gradient around a solution of the MAX-SAT problem includes using a SAT solver or using semi-definitive problem (SDP) relaxation.

According to an embodiment, a tangible, non-transitory computer-readable medium is provided that includes instructions thereon which, upon being executed by one or more processors, alone or in combination, provide for execution of method of learning and applying a rule set from relational data according to any method described herein.

In an embodiment, GRNs include a graph encoding module that maps graphs into a d-dimensional feature vector in $[0,1]^d$ and a differentiable satisfiability solver that learns logical rules based on the obtained representation.

According to embodiments, methods combine graphs and a differentiable satisfiability learner to mitigate the limitations of graph neural networks. According to one embodiment, a method may be implemented using two submodules: an encoder and a reasoner. The encoder is a module that takes the graph as input and generates an intermediate representation of the graph. The reasoner then generates a prediction for the graph based on the intermediate representation. For example, the encoder may be a function that maps from a graph g to a d-dimensional intermediate vector representation r. The intermediate vector representation r contains binary values (i.e. $r\_i \in [0,1]$) and/or probabilistic values (i.e. $r\_i \in [0,1]$). The reasoner may be a function that consumes/processes the d-dimensional vector r and generates a task-specific output o. In binary classification, the output will be a single bit that indicates the predicted class. Note that different to most neural networks, the output of the reasoner is not a probability distribution over all possible classes, but a discrete output representing the corresponding class. Hence, o∈{0,1} for a binary classification problem. The full architecture can then be represented easily as combination of both functions according to r=encoder (g), y=reasoner(r)

In the following, two different classes of encoder approaches that encode predefined and learned features, respectively, are presented.

Static Encoder

The first set of functions may include fixed, predefined features that encode information about the topology of the graph and the node features (when present). One approach to encode the topology as a vector is to flatten the corresponding adjacency matrix A into an adjacency string S. To this end, $A \in \mathbb{B}^{n \times n}$ is converted into $S \in \mathbb{B} \ B^{2n}$ according to $S_{i+n \cdot (j-1)} = A_{i,j}$ for $i,j \in \{1, \ldots, n\}$. The size of the adjacency matrix increases quadratically with the number of nodes in the graph, which is also true for the adjacency string S. However, in many datasets, such as NCH and PROTEINS, the number of nodes in the graphs may be rather small and thus allows for an application of this approach. Furthermore, in undirected graphs, only a part of the adjacency matrix needs to be encoded since it already contains all information about the graph topology. Moreover, the elements $A_{i,i}$ do not have to be encoded in S if the graphs do not contain self-loops. Hence, the size of the adjacency string S can be reduced to $$l = \frac{(n-1) \cdot n}{2}.$$

Besides encoding information about the topology, information about the node features can be also encoded in a vector representation, for example by concatenating all node features.

Learned Encoder

Encoding the topology with fixed representations such as a topology string or a 1-WL-based representation have been shown to be strong features. Another solution is to learn a fixed-sized permutation invariant encoding of the graph. To this end, permutation invariant graph neural networks (GNN) such as GCN or GAT can be used. Since the approach provides gradients not only for the rules but also for the input, the GNN can be trained jointly with the differentiable satisfiability solver such that it learns to generate a useful intermediate representation.

Combining Static and Learned Encoders

Another approach leverages both of the above encoders by combining a fixed graph representation with a learned graph representation. For example, the fixed graph representation can be concatenated with the learn graph representation. While one may not back-propagate gradients to the fixed graph representation, one can still backpropagate gradients to the GNN to train it. For example, in one configuration, there may be two encoders: one is fixed (for the topology) and the gradient can not be propagated and the second is a standard GNN where the gradient can be back propagated Embodiments of the present disclosure provide methods, systems and computer-readable media for learning human-understandable logical rules from data. In contrast to prior approaches, embodiments of the present invention do not require problem-specific adaption of the mapping from the input instances to the variables that are used in the logical rules. Thus, embodiments of the present invention can be flexibly applied to a wide range of technical problems and systems without manual adaption.

Deep learning has achieved major advances in machine learning. However, deep learning models are brittle and difficult to explain, which limits deep learning applications to scenarios where the input data is smooth and explainability is not required. On the other hand, logic-based reasoning can extrapolate to new regimes beyond the training data and offers high interpretability. However, logic-based reasoning currently requires handcrafted rules and, hence, is limited to human understanding and domain expertise. Machine learning, on the other hand, has shown the capability to learn to detect and discover patterns in the data, outperforming human capabilities, but is limited to the case where the distribution of the training data matches the test data.

There have been only a few attempts to combine deep learning and logic-based reasoning learn rules. In these approaches, the input is mapped to multiple binary variables that are used in logical rules. Then, the rules are learned via a maximum SAT (MAXSAT) formulation and can be used to complete unseen partial instances. However, the mapping from input instances to latent variables is fixed, i.e. the semantic of the logical variable is known a priori. These variables need to be manually specified before the training, which limits the applicability of the prior approach since the method needs to be manually adapted to every application domain. In addition, MAXSAT problems are defined over fixed variable size, thus limiting the previous approach to fix-structures. As known to one skilled in the art, SAT is the short term for Satisfiability Problem, while MAX-SAT is a version where one looks for the maximum number of rules to be satisfied.

Embodiments of the present disclosure provide solutions to this technical problem which learn the mapping from input instances to discrete variables end-to-end, and thereby enable the application of logic-based deep learning to new technical applications in different technological fields without additional manual effort. Embodiments of the present invention also provide a non-trivial training procedure which is designed to train the model.

To address the variable size and in particular the use of the logical model in more practical cases, embodiments of the present invention use the definition and the mapping of the MAXSAT problem to relational data, using graphs.

The following provides, inter alia, a discussion on:
1. How to learn the discrete variables, in particular, two example training procedures are presented to achieve the learning; and
2. The extension of MAXSAT to graph data, showing different models to capture the information and be able to learn rules that extend to unseen data and presenting operators to perform this mapping.

FIG. 1 illustrates an exemplary embodiment of a method and system for learning logical rules that define relationships among elements of molecules. Considering this system, it will be described how to learn discrete variables, in particular using two training procedures to achieve the learning, according to an exemplary embodiment. The input data received in this embodiment includes example molecules, and the system is trained to reproduce these examples by learning the rules that define the relationships among the elements of the molecules (e.g. binding of atoms). Since many properties are difficult to describe, a procedure is defined to learn to reproduce valid molecules also from partial molecules. After training, the procedure can be applied to generate new molecules not seen before that respect the observable binding rules from the examples (Testing). A traditional system would only be able to interpolate among seen instances and not generalize well with new samples.

Various embodiments herein address the technical problems of the mapping of the input features to the hidden discrete logical variables, and the representation of the rules on graphs to be able to properly capture the rules, e.g., among molecules' components.

Figure 2:
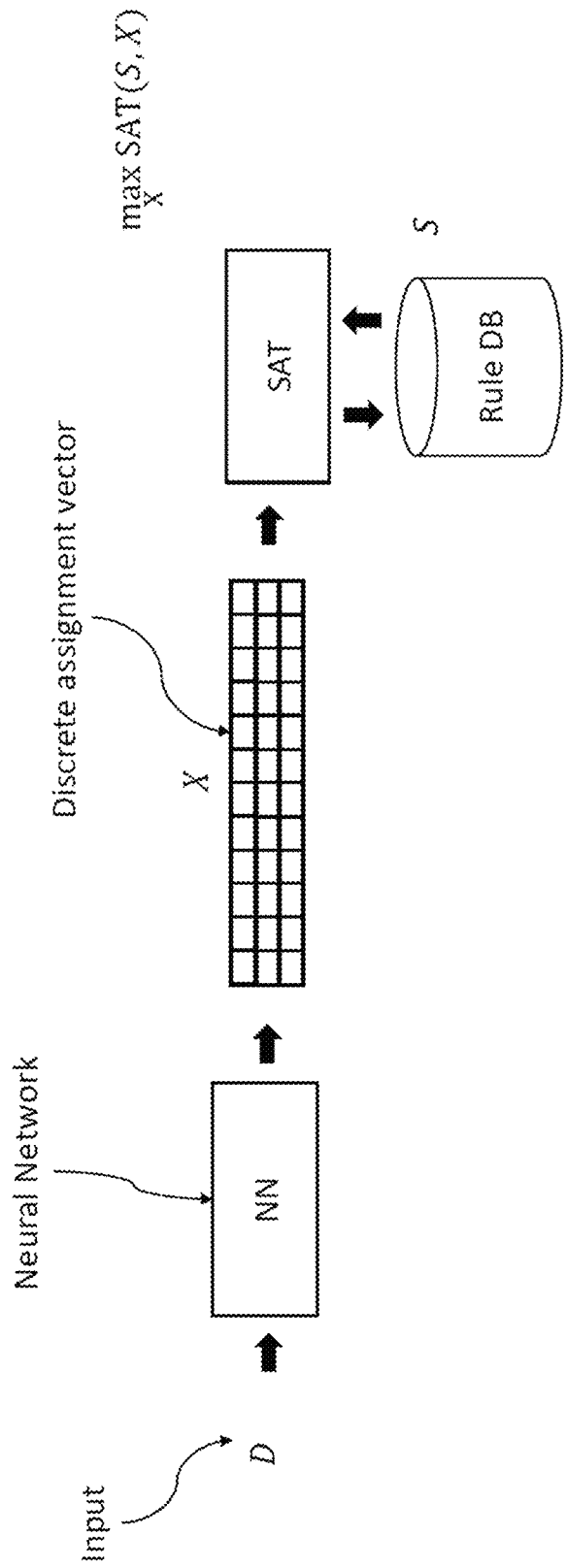
FIG. 2 illustrates a general setup of a method and system for learning logical rules according to an embodiment.

The method according to embodiments learns to map an input instance to a discrete assignment vector jointly with logical rules as illustrated in FIG. 2, and learns to assign properties of the input to the discrete assignment vector. The binary variables in the assignment vector are used to learn logical rules that describe the rules that are satisfied by the data.

Figure 3:
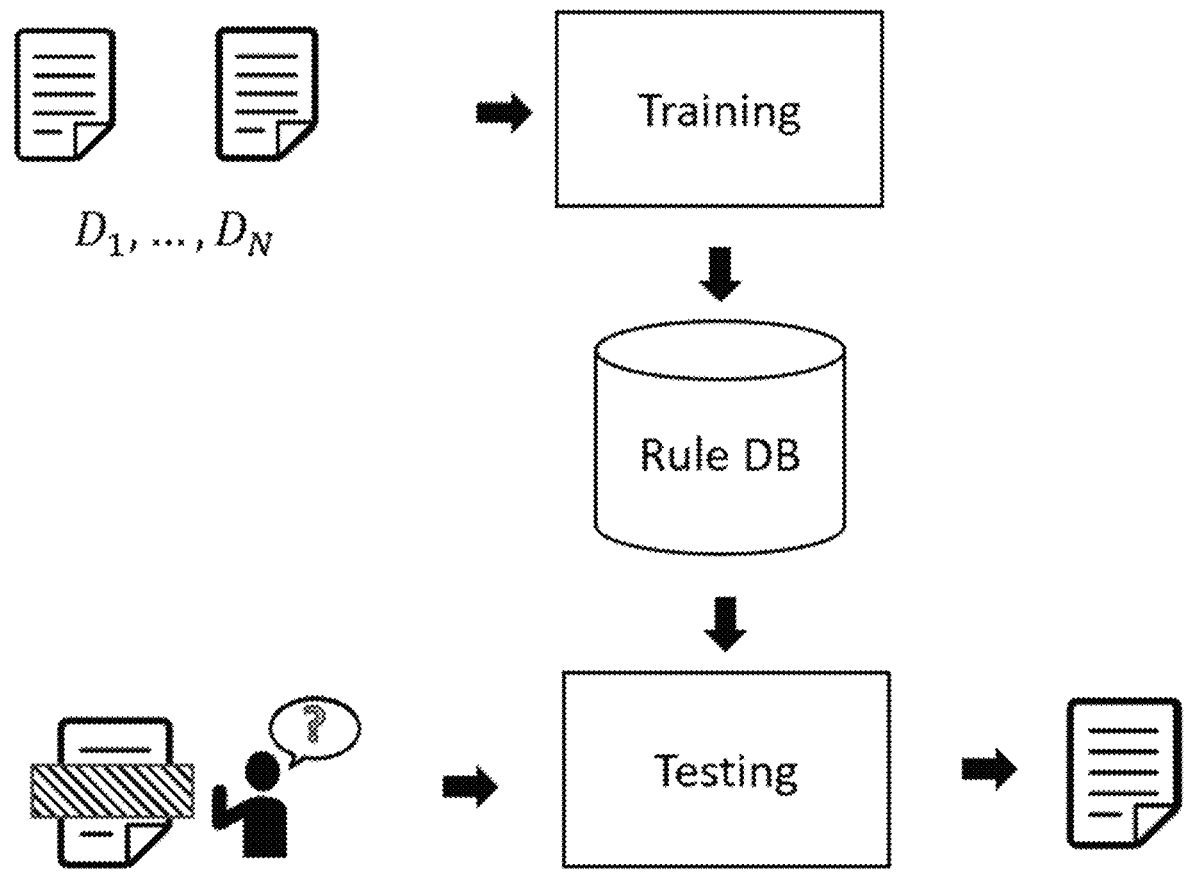
FIG. 3 illustrates an overview of training and testing according to an embodiment.

FIG. 2 illustrates a general setup for learning the mapping. In general, the input, D, can belong to a wide range of input types including texts, images, and videos, or any other data types such as molecular or chemical data or structures. The following discussion focuses on graphs as input instances since they represent an important application domain of the method. Examples of the input data are accessed, then the training is performed and then, after computing the rules, the trained model is used to complete partial information. FIG. 3 shows a training and testing overview, similar to FIG. 1.

Embodiments of the present invention can be advantageously applied to graphs or any relational input data which can be represented using graphs. In order to use simple rules that extend to general graph size, various definitions of graph MAXSAT are introduced that allow to learn rules over graphs. Then, specialization to the linear case allows for efficient use in differentiable architectures.

Figure 4:
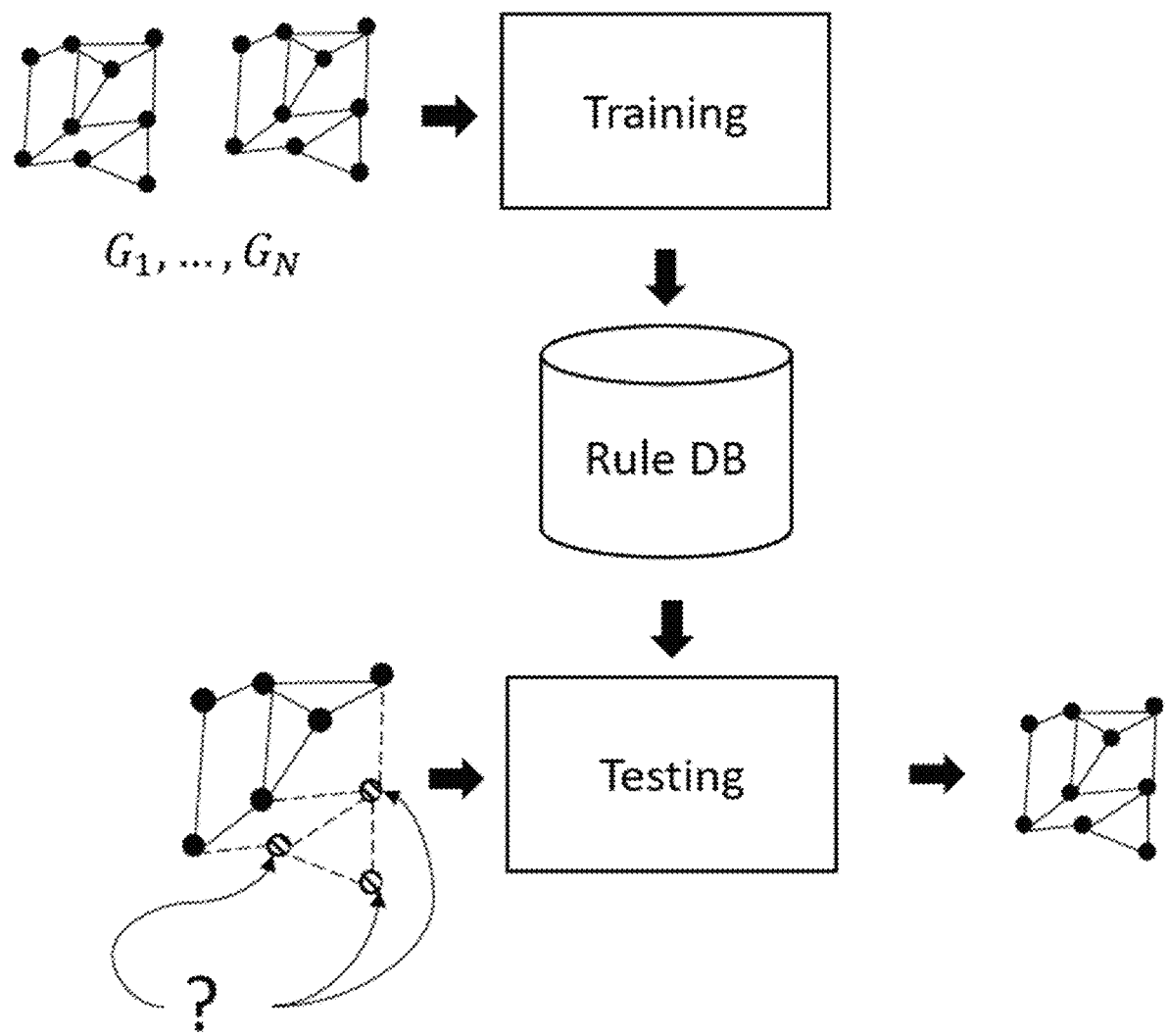
FIG. 4 illustrates learning and use of rules that describe the system according to an embodiment.
Figure 5:
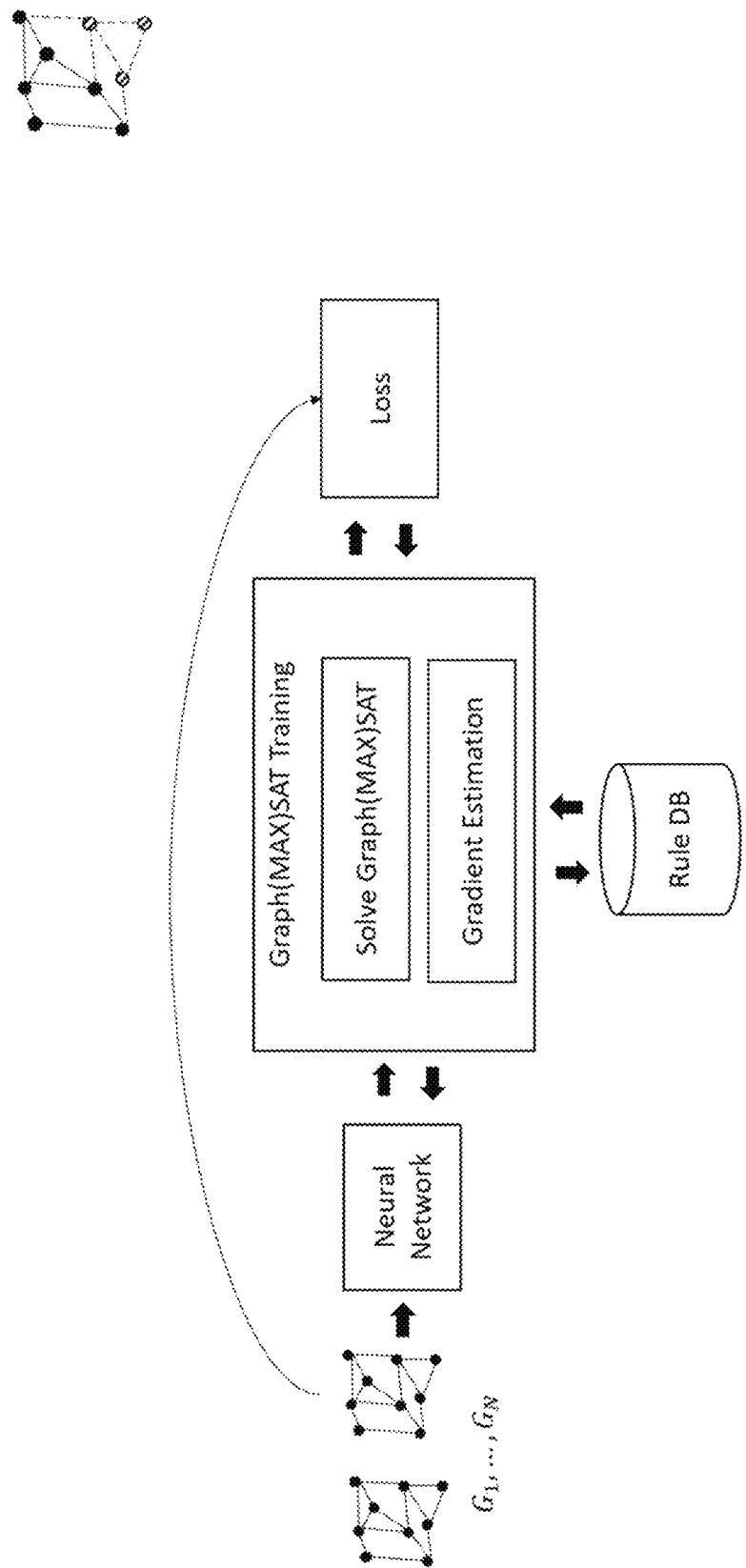
FIG. 5 illustrates a training procedure around a satisfiability problem (SAT) solution according to an embodiment.
Figure 6:
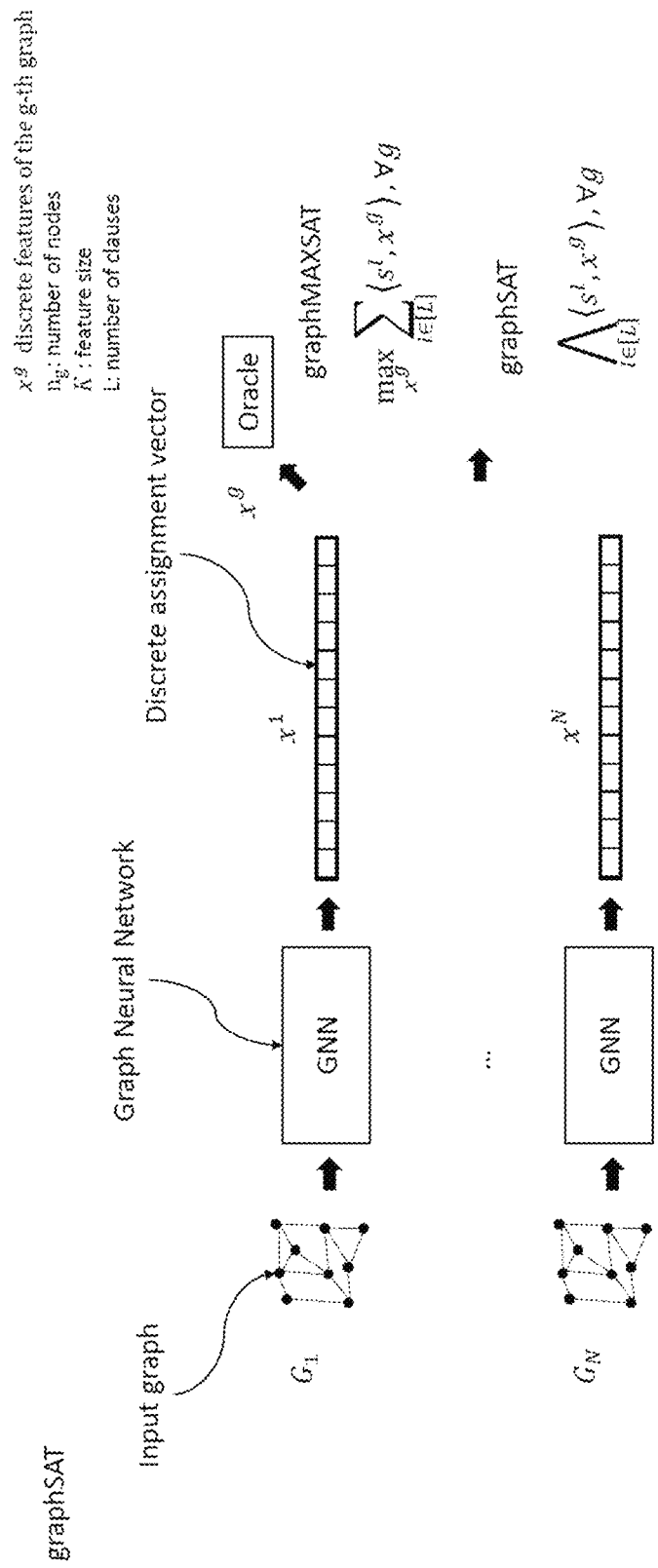
FIG. 6 illustrates an embodiment which is referred to herein as GraphSAT.
Figure 7:
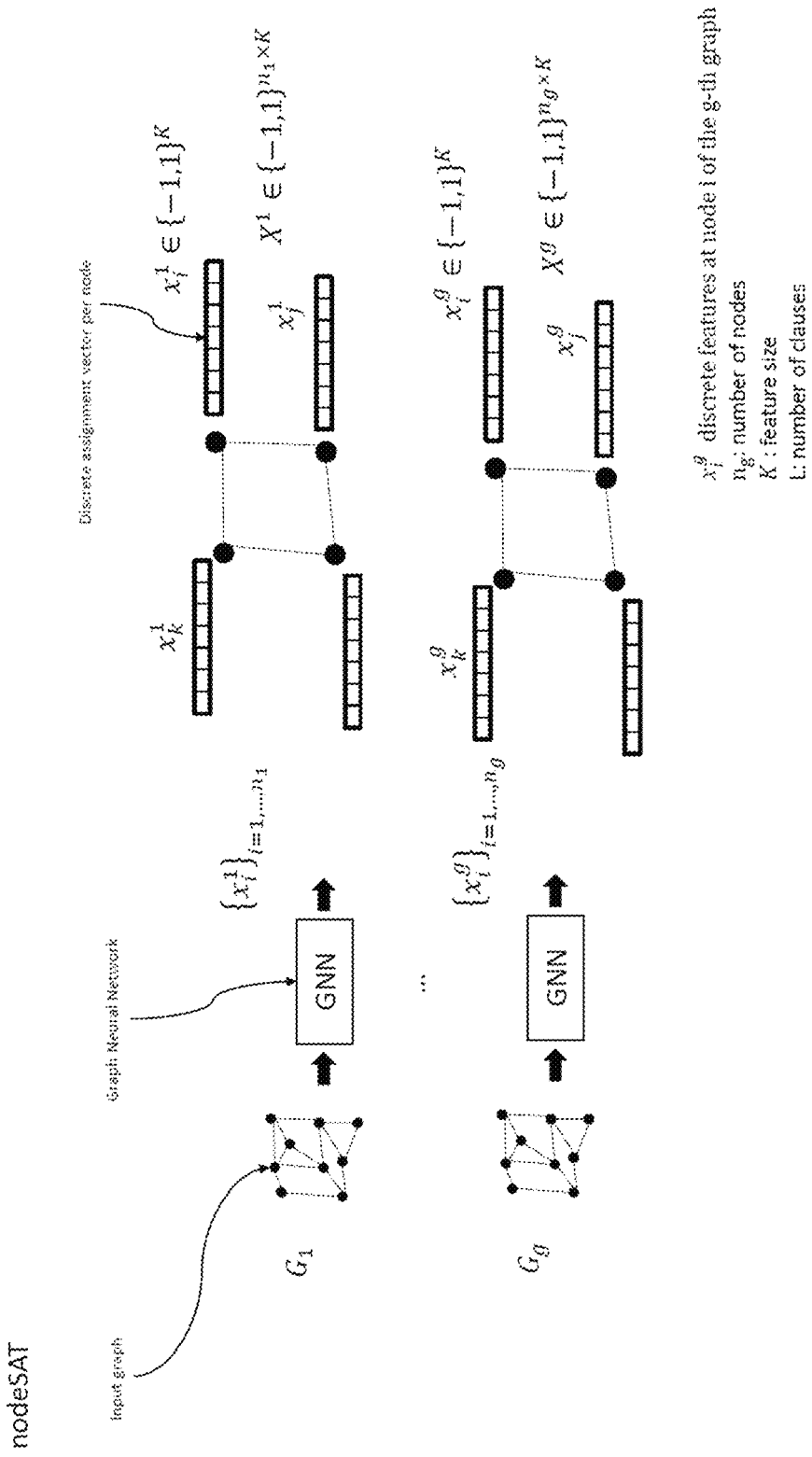
FIG. 7 illustrates an embodiment which is referred to herein as NodeSAT.
Figure 8:
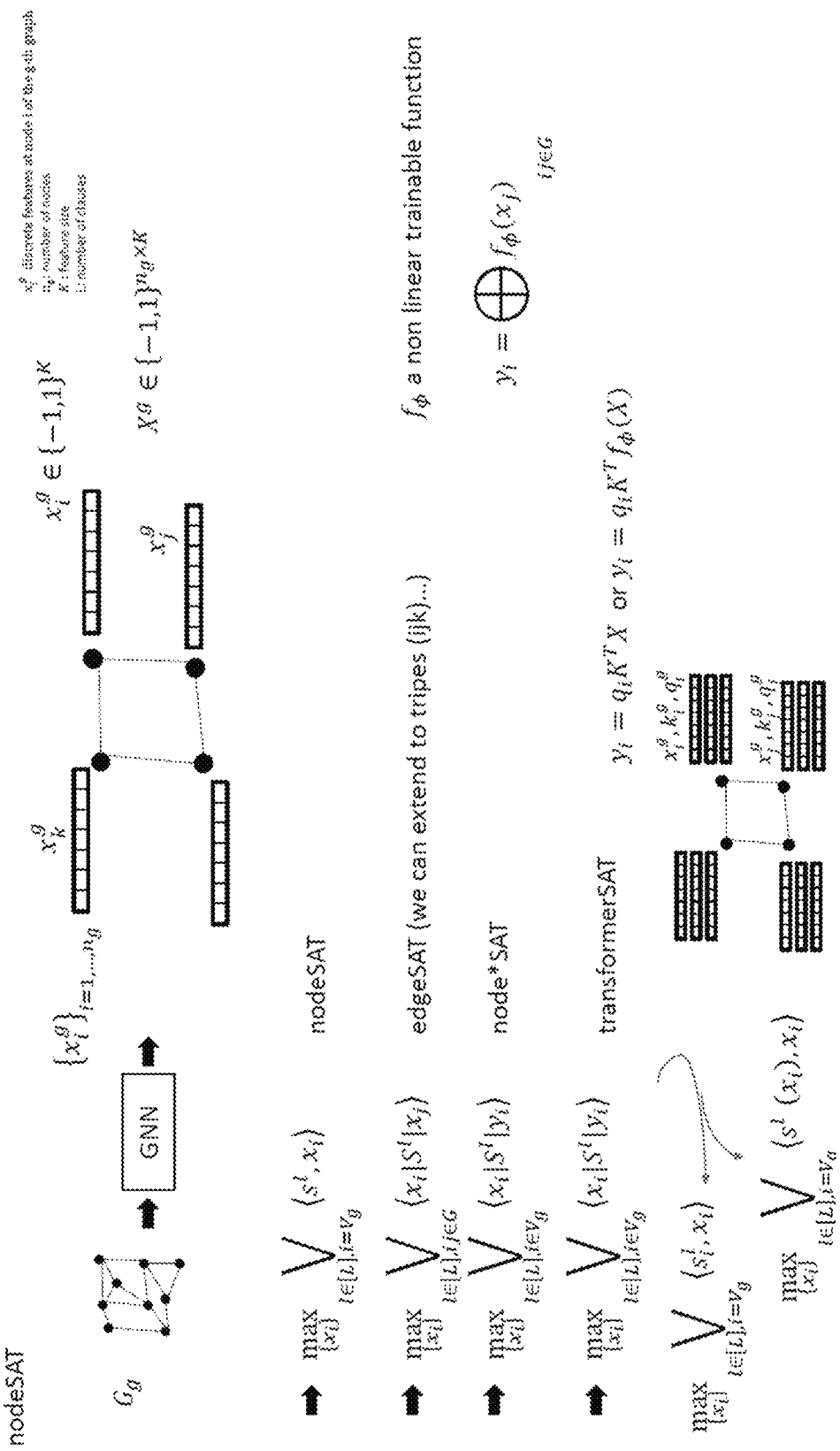
FIG. 8 illustrates various type of NodeSAT according to exemplary embodiments.

FIG. 4 shows a method and system of learning of rules over graphs according to an embodiment of the present disclosure. In this example, there is only access to the output of the system and this output can be described as a graph or graphs. The goal is then to learn the rules that these graphs obey. A set of rules for a SAT is described over a graph (GraphSAT). The GraphSAT may be characterized by the following:
1. Define a (max)SAT over a graph.
2. The SAT problem describes properties that the graph needs to have.
3. Properties can be:
   a. Global: for the entire graph
   b. Local:
      i. Single node
      ii. Node and each neighbor
      iii. Node and its neighbor
      iv. Node and every other node For Graph(MAX)SAT training, embodiments of which are shown in FIG. 5 and in FIG. 17, the graphs are received (FIG. 5) or generated from the data/training samples (FIG. 17). Generating or building a graph structure may be done according to various methods as known to one skilled in the art, such as using the k-nearest neighbors or using some thresholds on the input node features similarity (Euclidean for example), or other method. There is a loss to measure the performance of the system. The system is composed of two parts:
1. The actual Graph(MAX)SAT solver, that given the set of rules computes the solution that maximally satisfies the rules.
2. When the loss is evaluated and the gradient computed, the gradient of the GraphSAT module is used:
   a. To update the rule set
   b. To update upstream neural network Embodiments of the present invention provide the following types of GraphSAT:
1. graphSAT: Here, as shown in FIG. 6, the rule is applied to the graph as a whole. In this case, a MAX-SAT problem is associated for the whole graph
2. nodeSAT: Here, as shown in FIG. 7 and in FIG. 8, for each node of the graph, a learned discrete feature is associated, and each node's discrete feature needs to satisfy the MAX-SAT problem.
3. edgeSAT: Here, as in nodeSAT, each node has an associated learned discrete feature. For each edge of the graph, the feature of these two nodes needs to satisfy a join SAT problem. (see, FIG. 8)
4. node*SAT: Here, the approach is similar to edgeSAT, but the join SAT is satisfied by a combination of features of the nodes that are neighbor of the node. (see, FIG. 8)
5. transformerSAT: Here, the feature of a node needs to satisfy a discrete feature derived by all the features of the other nodes based on a discrete attention mechanism. (see, FIG. 8)

With respect to GraphSAT operators, as shown in FIG. 9, two implementations of a join SAT problem of discrete node features are:
1) a quadrative form on the node features where the rule is a discrete matrix; and
2) the concatenation of the node features and in this case the rule is the concatenation of the rule for each node.

Figure 19:
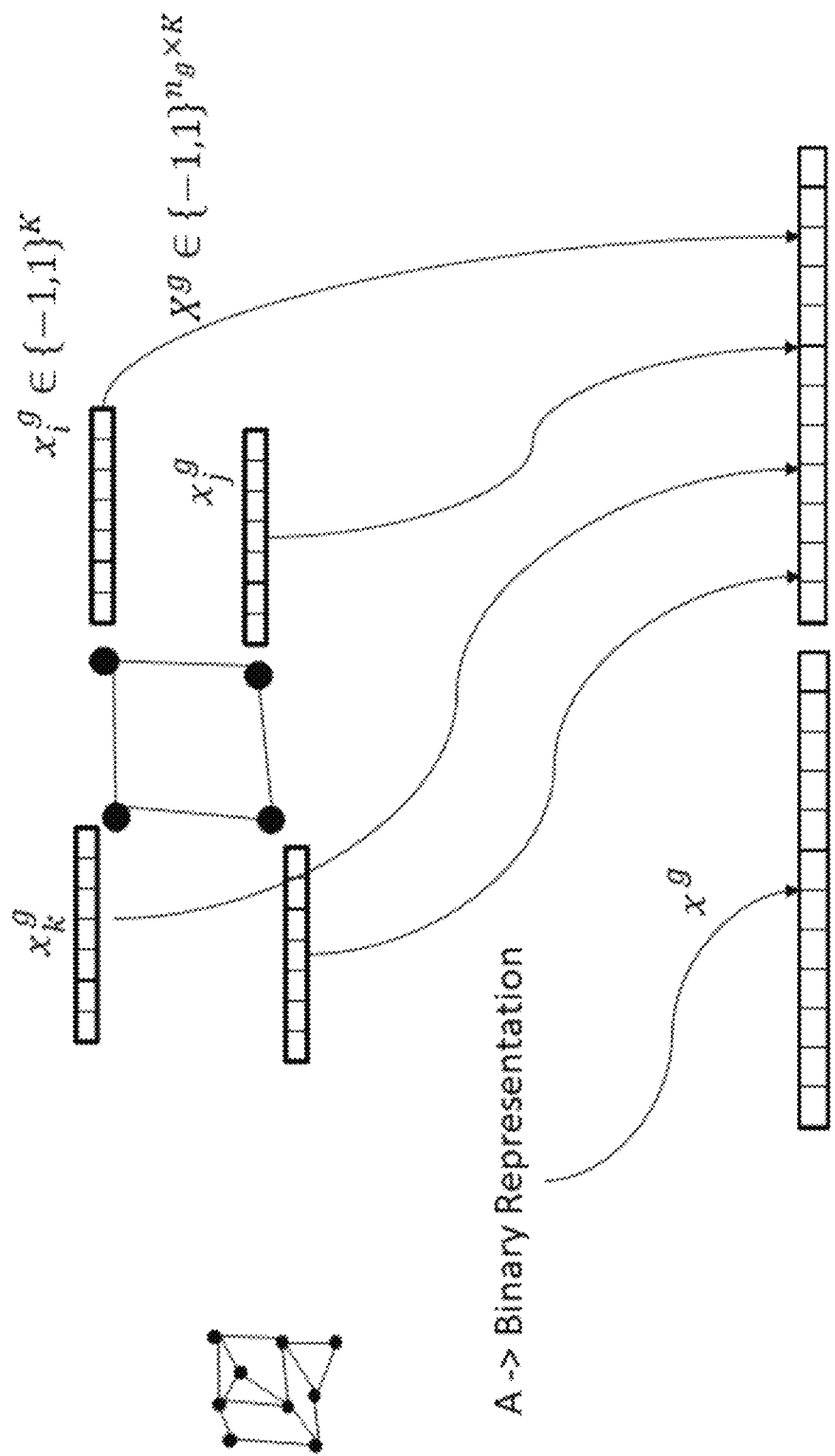
FIG. 19 illustrates mapping of topology of a graph with features representation into a single vector according to an embodiment.

FIG. 19 illustrates mapping of the topology of a graph with a features representation into a single vector according to an embodiment. In this embodiment, for the mapping of the features of the nodes $\{x_i^g\}_{i=1}^{n_g}$ to a binary encoding $x^g_{node}=[x_1^g, \ldots, x_{n_g}^g]$, the size will be nk, where k are the size of the features and $n=\max_g n_g$ the maximum number of nodes; where the order of the concatenation is given by the canonical ordering. For the binary encoding of the graph $x^g_{topology}$, of fixed size, using the Adjacent Matrix transformed to the canonical representation and then read row by row as a binary vector, where the size of the adjacent matrix is expanded to the missing nodes, with zero edges, if the number of node is less than the maximum number. Thus the graph is encoded in a binary vector $x^g=[x^g_{node}, x^g_{topology}]$.

With respect to linear operators, a special version of the mapping from fix-MAXSAT to graph-MAXSAT is used utilizing the following linear operator:

$$X = \sigma_{A,B}(C,D) = A \otimes C + B \otimes D$$

which may take two forms:
1. using the edge matrices E+, E−

$$S = \sigma_{E^+, E^-}(S^+, S^-)$$

2. or using the adjacent matrix A $$S = \sigma_{I_n, A}(S^+, S^-)$$

Figure 10:
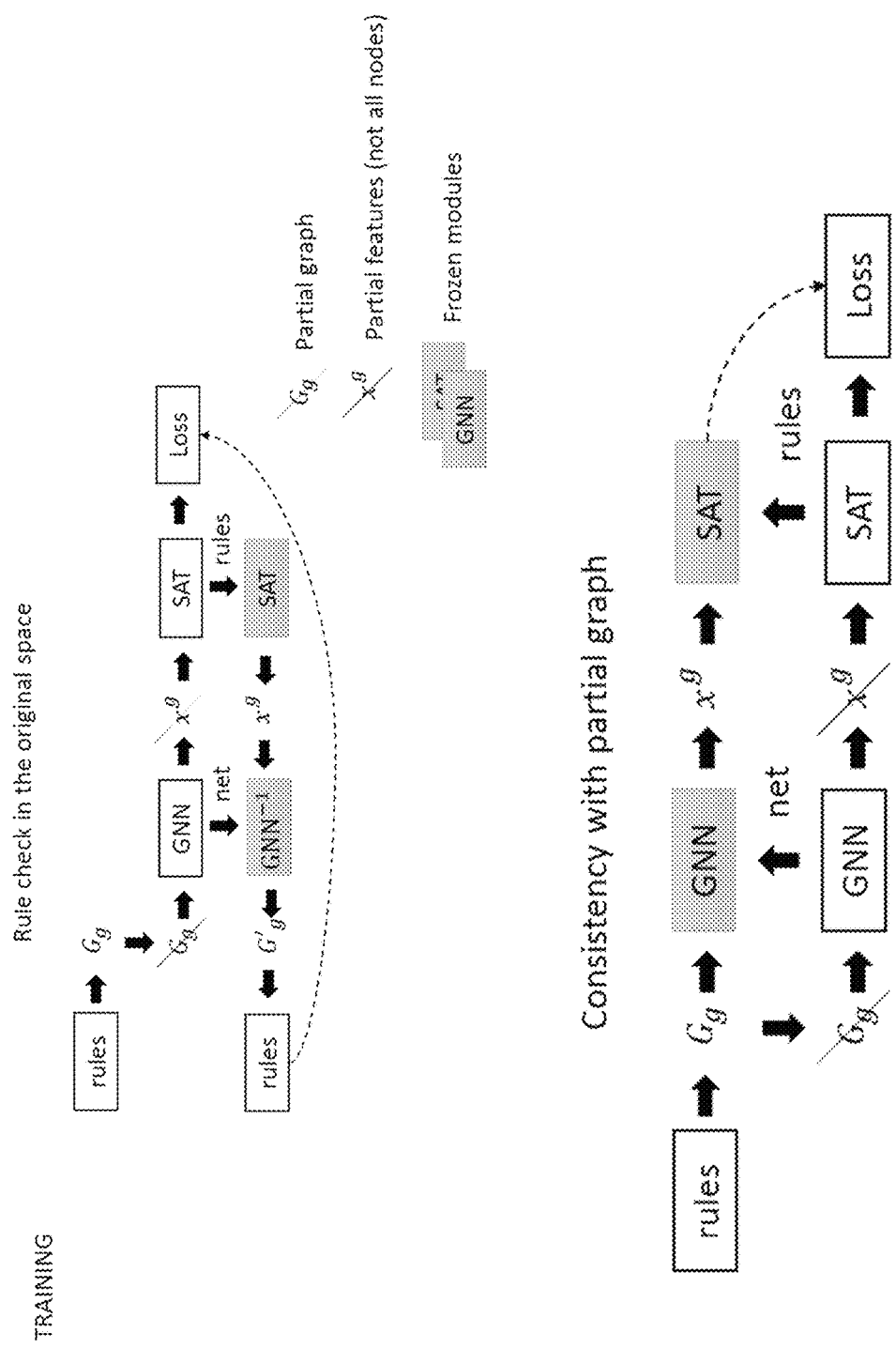
FIG. 10 illustrates training procedures according to exemplary embodiments.

FIG. 10 illustrates training procedures according to embodiments. An important property of the method according to an embodiment of the present disclosure is to learn to assign inputs to corresponding discrete assignment vectors. However, a goal is to allow the method to discover their own assignment due to two reasons. First, the applicability of logic-based deep learning is limited if the assignments are fixed, since domain expertise is required to manually implement the mapping. Second, the success of deep learning demonstrates that it is beneficial when machine learning methods are allowed to learn their own mapping that is optimized for the task at hand. Hence, standard supervised training may not be possible. As a solution, two training options according to embodiments of the present invention are described in the following.

Figure 11:
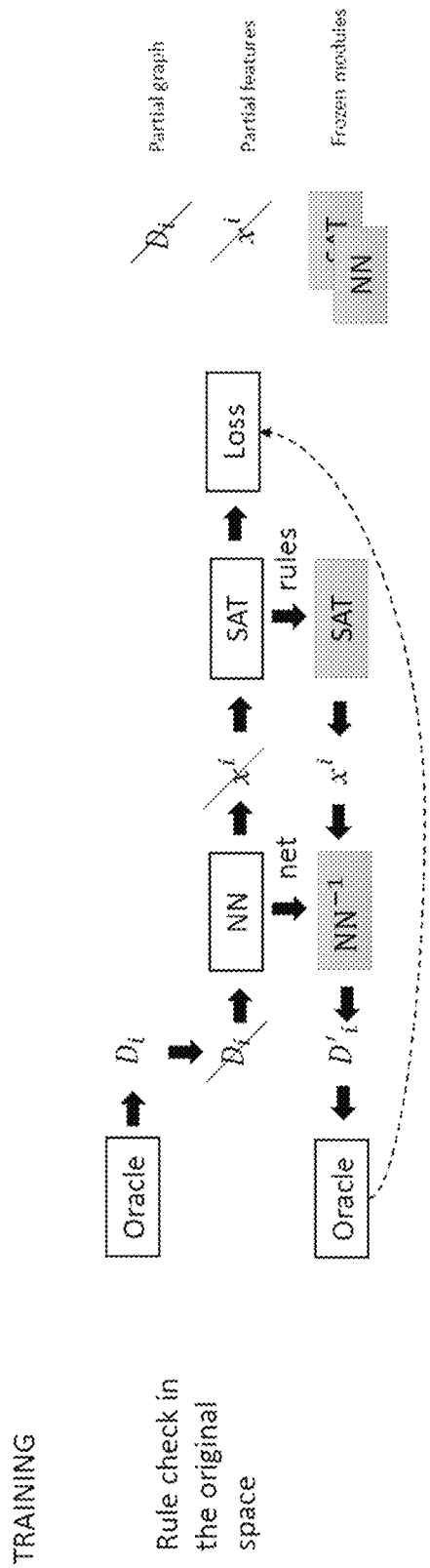
FIG. 11 illustrates Oracle training as a rule check in the original space according to an embodiment.

FIG. 11 illustrates a rule check/oracle training according to an embodiment. As used herein, an oracle is intended as a component that knows the exact solution; at training time this is possible because the exact solution may first be generated and then a partial solution may be sent for the model to predict the missing part. Even if there is no access to the rule set, it is possible generate the samples and to generate partial graphs, and to verify if the rules are verified. In this case, it is assumed there is an oracle that can implement this task. This situation can be true if the goal is to embed the rules in a more complex system. In this case, the perception is done using a neural network and the rules are integrated in the internal representation of the system. One example application of this is for automated driving. The perception is implemented using the visual system and machine learning, while the interaction of the road user is implemented via rules. Another scenario is where there is a system that: 1) generates the sample using the rules and 2) generates also partials that respects those rules or 3) the system is able to tell if the generated solution from the partial solution respects the rule. For example, an embodiment of the present invention can provide to complete a molecule, if the result is a valid molecule (either toxic or instable) is given from the law of physics or by some other interactions.

Figure 12:
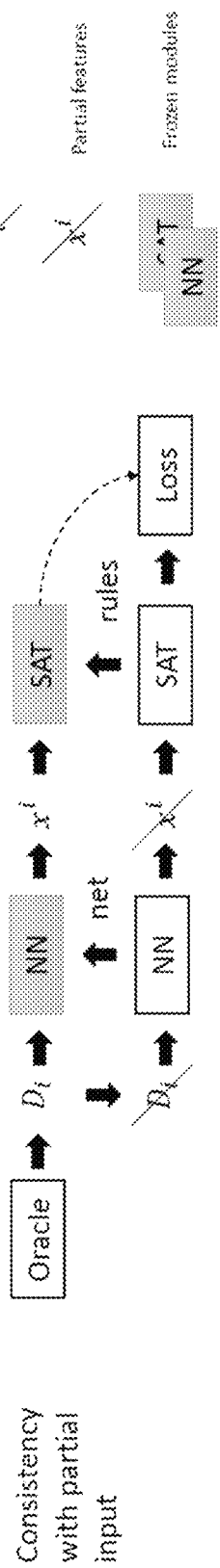
FIG. 12 illustrates consistency training according to an embodiment.

For data/graph consistency, FIG. 12 shows consistency training according to an embodiment. In this case, a partial graph is generated from the original sample, and it is then verified that the learned rules are consistent with the full graph. Below the case with generic data $D_i$ is described.

Embodiments of the present invention can be used for a number of technical applications. In the following, three different scenarios are described, each of which solves a different user need. First, embodiments of the present disclosure can be used to extract human-understandable rules from a large dataset, which allows users to gain domain knowledge of the data at hand. Second, embodiments of the present disclosure can be used to complete partial instances. Third, embodiments of the present disclosure can be used to check instance validity, i.e. check if an instance satisfies all learned rules. A concrete use case is described for each scenario in the following.

In the first scenario, a user may want to gain new domain knowledge by inspecting the logical rules learned by the method. For instance, a company in the medical domain wants to gain knowledge about the physical conditions of a large set of subjects. To this end, the company trains the method on the data of the subjects. After the training process, the method has learned rules that are satisfied by the subjects. Since the knowledge is encoded in human-understandable logical rules, it is much easier to gain additional domain knowledge. For instance, the method could have learned that subjects with a specific physical condition are likely to develop a specific disease. This information could be highly valuable to guide drug development.

Other examples include:
1. A user may be interested to better understand the rules that determine the behavior of a dynamic system.
   a. Modelling dynamic system is important in industrial applications. When mechanical or chemical system interacts, the sequence of the states can depend on underlying physical interactions that follows unknown rules, or the fundamental laws are known, but the interaction of multiple factors is not observable. In this case, the data of the system is collected in various states and the evolution and model set of rules that describes the dynamics is determined. These rules can then be used for: 1) predicting the evolution of the system in real operation or in simulation; 2) evaluating the reason of the rules to improve the functioning of the system; and/or 3) automatically controlling the system based on the prediction and on the rules.
2. A user may be interested to gain domain knowledge for preventive maintenance.

In another scenario, a user may want to complete partial instances. For instance, a telecommunication company wants to assign/connect resources such as base stations and smartphones. In this case, the company has a partial graph consisting of base stations and smartphones in which some of the smartphones are already connected to base stations. These connections define a partial graph. Now, the company wants to connect more smartphones to base stations. However, this is not easily possible due to the high complexity of the communication network (i.e. it is not easily possible to specify rules to solve this task). Instead of manually specifying rules, the company trains the method on a set of successful connection setups that have been recorded in the past. The method learns rules that are satisfied in successful connection setups and can apply these rules to new situations. In contrast to the first scenario, the user is not mainly interested in gaining additional domain knowledge. However, both scenarios are not mutually exclusive. For instance, the learned rules can be also inspected by the management of the system to plan future upgrades.

Other examples include:
1. Learning the evolution rules of biological systems or chemical compounds
2. Knowledge graph completion
3. Learning rules for autonomous driving
   a. The perception is implemented using vision and machine learning, but the interaction among road user is modelled via logic variables. The system receives the feedback is the solution of the interaction is appropriate or not using the traffic rules.
4. Resource allocation: Virtual Function in a backbone network
5. Check instance validity In the last scenario, a user may want to check the validity of an instance. An instance is valid if it satisfies all constraints imposed by the rules. For instance, a company wants to check if the information in a text, e.g. a social media post, is valid. To this end, the company trains the method on a set of reliable texts, e.g. from reliable news agencies. The method learns the rules that are satisfied by the texts. The social media post is valid if it satisfies the learned rules.

Other examples may include:
1. Computer code verification
   a. The method is trained on a set of valid computer programs. Hence, it learns the syntax of the programing language. The method can then be used to check if a new program satisfies all rules that have been identified by the method.
2. Natural language text verification
   a. A user wants to verify that a text satisfies natural language rules. To this end, the system is training on a set of valid texts. Then, the method can be used if the new text satisfies all learned rules. It is especially advantageous that the method is not limited to grammar rules, but can also identify other regular patterns in the text.

Figure 13:
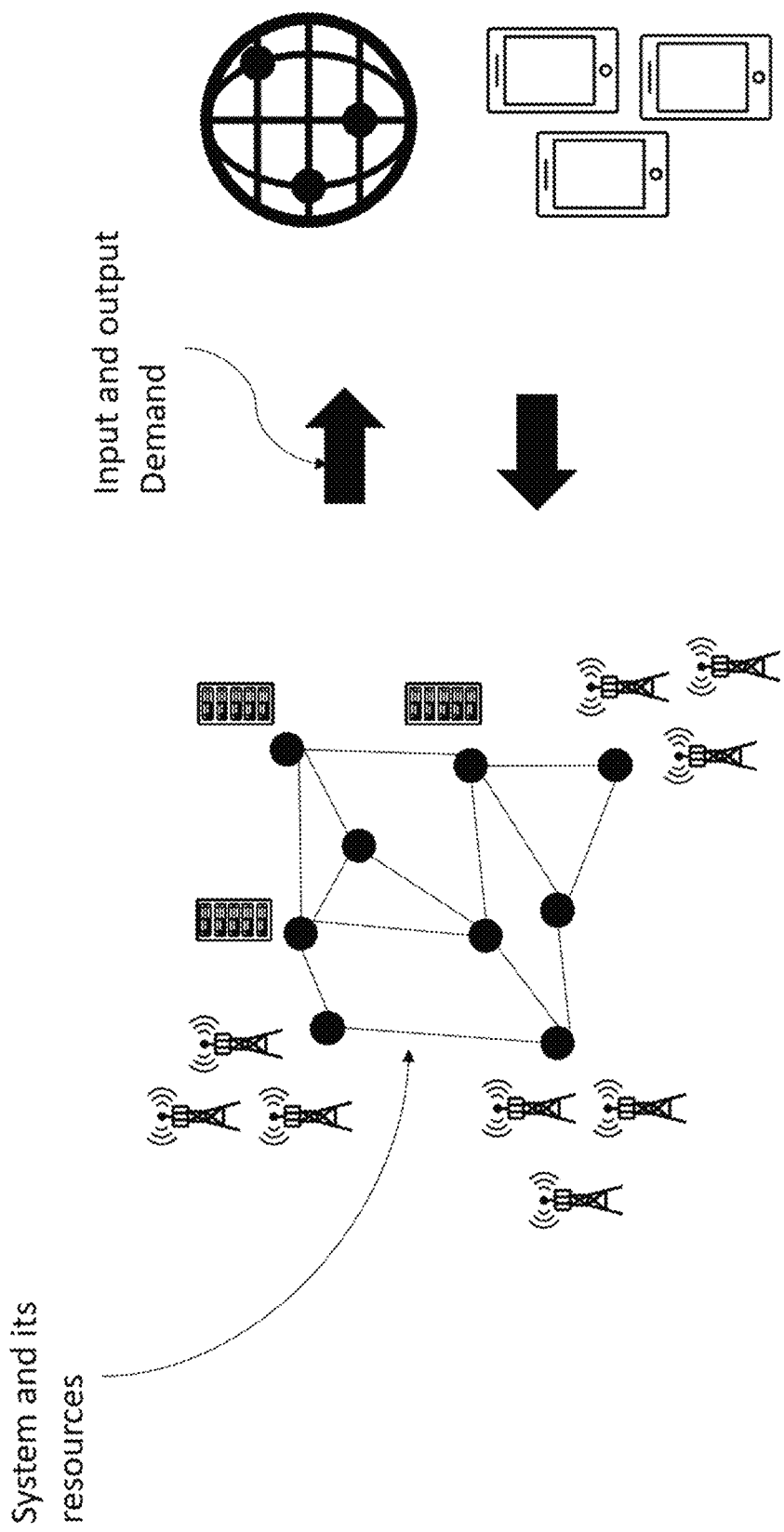
FIG. 13 illustrates an exemplary application of an exemplary embodiment of a method applicable to a telecommunications system.

Another embodiment of the present disclosure provides for resource allocation in a communication network. In particular, this addressed the problem of allocating resources, in particular Virtual Network Functions (VNFs), or complete Virtual Mobile Networks (VMNs) in network slice managed networks. The communication network is composed of nodes where the resource is available and the demand that the system need to serve. As shown in FIG. 13, the system may be defined by its:

1. Resources: Routers, servers and base-stations that can host VNF and/or assign part of the bandwidth as VMN; and
2. Demand: Either in terms of overall point-point traffic or associated to a specific VMN.

Figure 14:
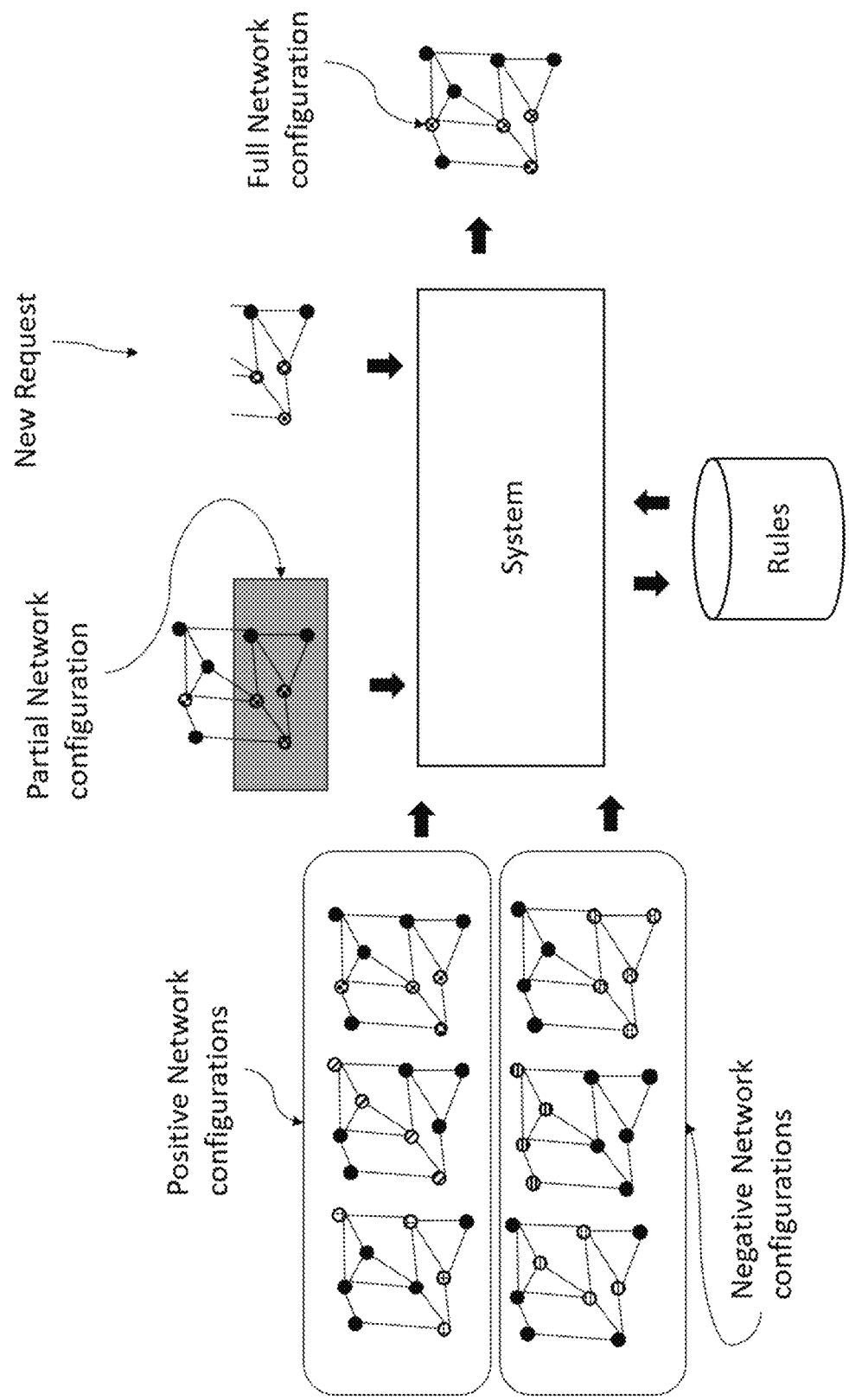
FIG. 14 illustrates an exemplary application of an exemplary embodiment of a method for resource allocation in a telecommunication network.

Then, examples of the system configurations are used, which either were positive (no network failures/congestions) or negative (sever network congestions), to learn the rules. These rules are then used when a new request arrives to verify that the system is capable of accepting the request and how the request is then implemented by producing a feasible solution, the full network configuration. The configurations are then used to allocate resources to the network and to allocate communication bandwidth by controlling the routing function and allocating the packets on the network as shown in FIG. 14.

Figure 15:
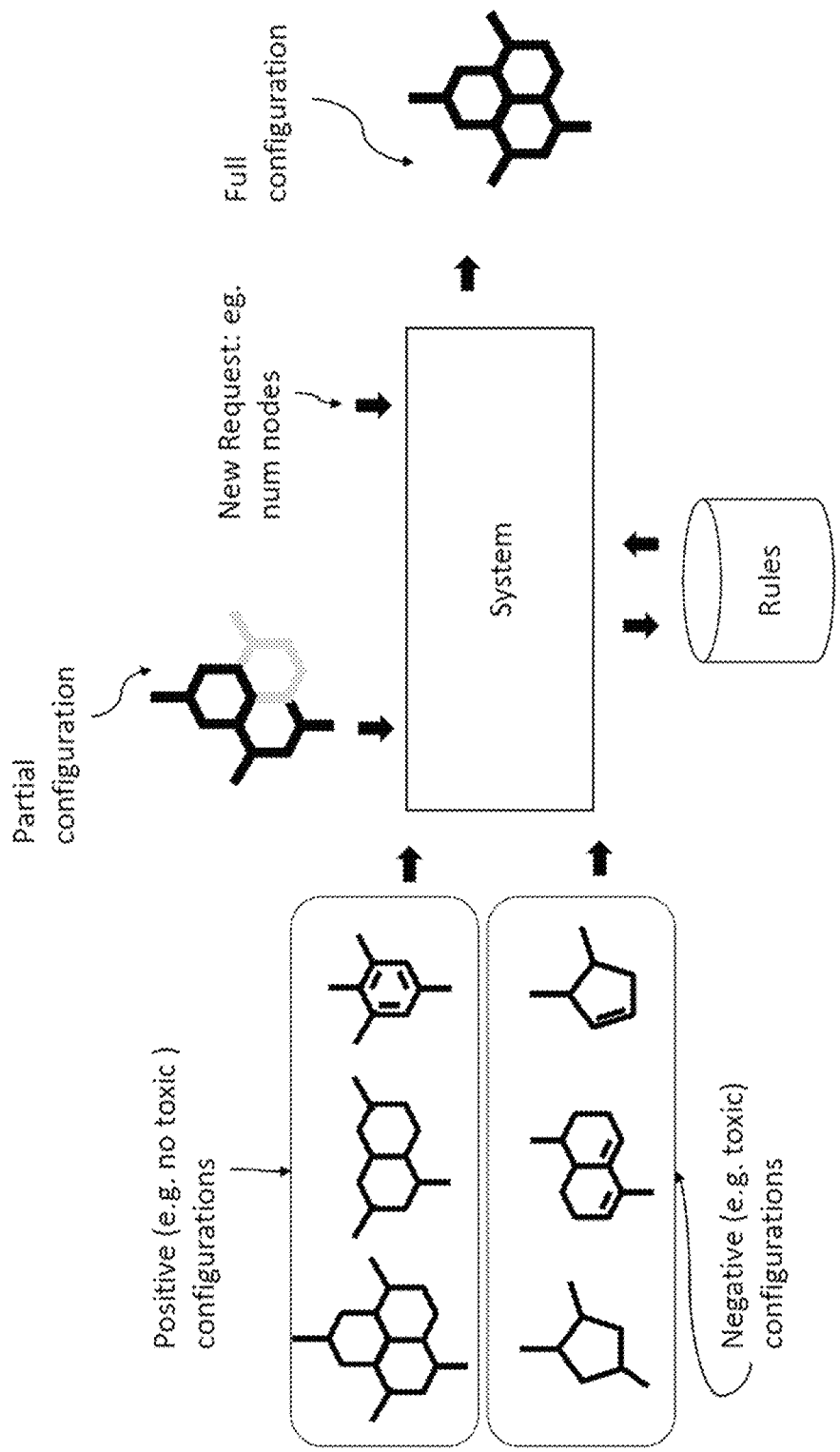
FIG. 15 illustrates an exemplary application of an exemplary embodiment of a method for design of a new protein or molecule.

Another embodiment of the present disclosure is applied to the chemistry and biology fields for the automatic completion of molecules or compounds, or discovery of a new vaccine as shown in FIG. 15. When dealing with complex molecules (e.g. proteins), the description of the rules that form the molecule (e.g. the folding) is complex and depends on various factors. It is considered here the automatic learning of positive and negative configurations defined by the rules and the mapping to the discrete variables that defined the status of the molecule. The input includes example molecules described, e.g., as graphs. The training is then performed, and the learned model is used to design a new molecule (e.g. protein) by requiring the system to complete a partial graph. The system can also be used to verify the validity of a molecule defined via other tools. The output of the system is thus the new molecule that can then be synthetized and further tested.

Figure 16:
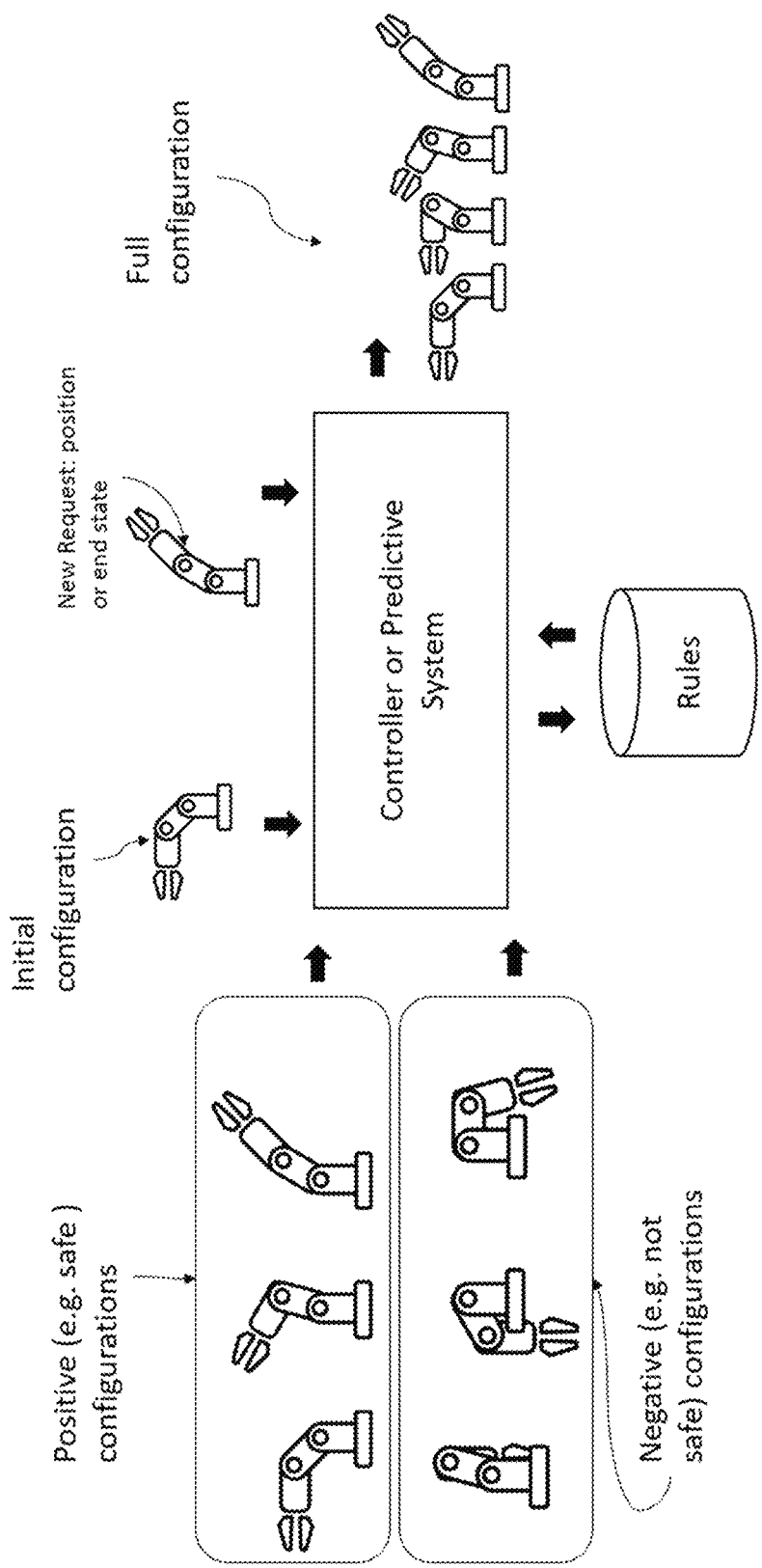
FIG. 16 illustrates an exemplary application of an exemplary embodiment of a method for safety control in an industrial plant.

Another embodiment of the present disclosure is applied to the industrial field for the control of a plant and/or to avoid failure mode as shown in FIG. 16. Here, the problem may be how to protect a system from entry in unsafe conditions. The input for training includes the past (or simulated) states of the real system, both positive (safe) and negative (unsafe). The controller is trained to learn the rules of the systems for the two cases. Then, the learned system is used to control the industrial plant among safe states. The controller obtains or receives the current state of the plant and produces a sequence of safe states, which then are implemented in the plant.

Embodiments of the present invention provide for the following improvements:

1. Learning mapping from input to latent: Automatic Learning of the mapping between the input sample and the latent discrete assignment (end to end learned):
   a. Where the input is a graph or any other data structure.
   b. Where the training is either using the Oracle or the consistency (e.g. partial samples) training mode.
2. Extension of SAT to graph: Definition of rule set over a discrete and learnable feature either on the whole graph or on its nodes. The training is implemented by solving the associated MAX-SAT and then estimating the gradients around this solution. The method is characterized by the following steps:
   a. Associate one discrete feature for each graph or for each node of the graph.
   b. Define a SAT problem on the discrete feature of each graph either on the whole graph or on the node features.
   c. Linear mapping which is differentiable.
   d. Estimate the gradient to learn the rules and the propagate the gradient based on the solution of the MAXSAT problem.
   e. Gradient estimation may use either an existing SAT solver or may use Semi-definitive problem (SDP) relaxation.
3. Generalization of the rules to multiple environments.
4. Providing for explainability and interpretability of the learned rules.
5. Automatic learning of the mapping to the discrete variables.
6. Modelling SAT on graph.

In an embodiment, the present disclosure provides a method comprising the following steps:
1. Collect the sample from the system and build the associated graphs.
2. Build the (graph)SAT problem on the graph (see, e.g., 2.a, 2.b above).
3. Train the system using one of two options (see, e.g., 1.b above), where the gradient is estimated around the current solution of the (graph)MAXSAT problem (e.g., see 2.d, 2.e above); the training produces the rules and the mapping from the input to the internal discrete assignment variables (see, e.g., 1 above).
4. Use the learned rule set over the (graph)SAT problem and use to process (e.g., complete, validate) new test graphs.

The method can also include the following steps:
1. Collect training data (e.g. a set of graphs, a set of texts, a set of images, etc.).
2. Setup the model/architecture (see FIG. 1, FIG. 2).
3. Train the method with one of the two proposed training methods or with both of them (see FIGS. 10 and 11). The method automatically learns to assign properties of the instances to the binary assignment vector and learns the rules that the instances satisfy jointly (see FIG. 1, FIG. 2).
4. Apply the method to complete partial instances (see, e.g., FIG. 1, FIG. 4)

Embodiments of the present invention can be applied to systems whose state and rules can be defined as discrete variables (and thus can be mapped to booleans). The system produces internal rules, and these rules are used for explainability. A user interface, for example, can allow the user to see, add, remove or change rules that change the behavior of the system, and/or see ow the system is configured and works (manual: semantic is flexible and end-to-end trainable).

In contrast to embodiments of the present invention, traditional methods of prediction do not include reasoning and adherence to rules fails. Manually mapping the rules may be possible as an alternative, but is time consuming and may not be possible if rules are not known. Alternatively, not using a graph to represent information would also be possible, but would also suffer from drawbacks.

Figure 18:
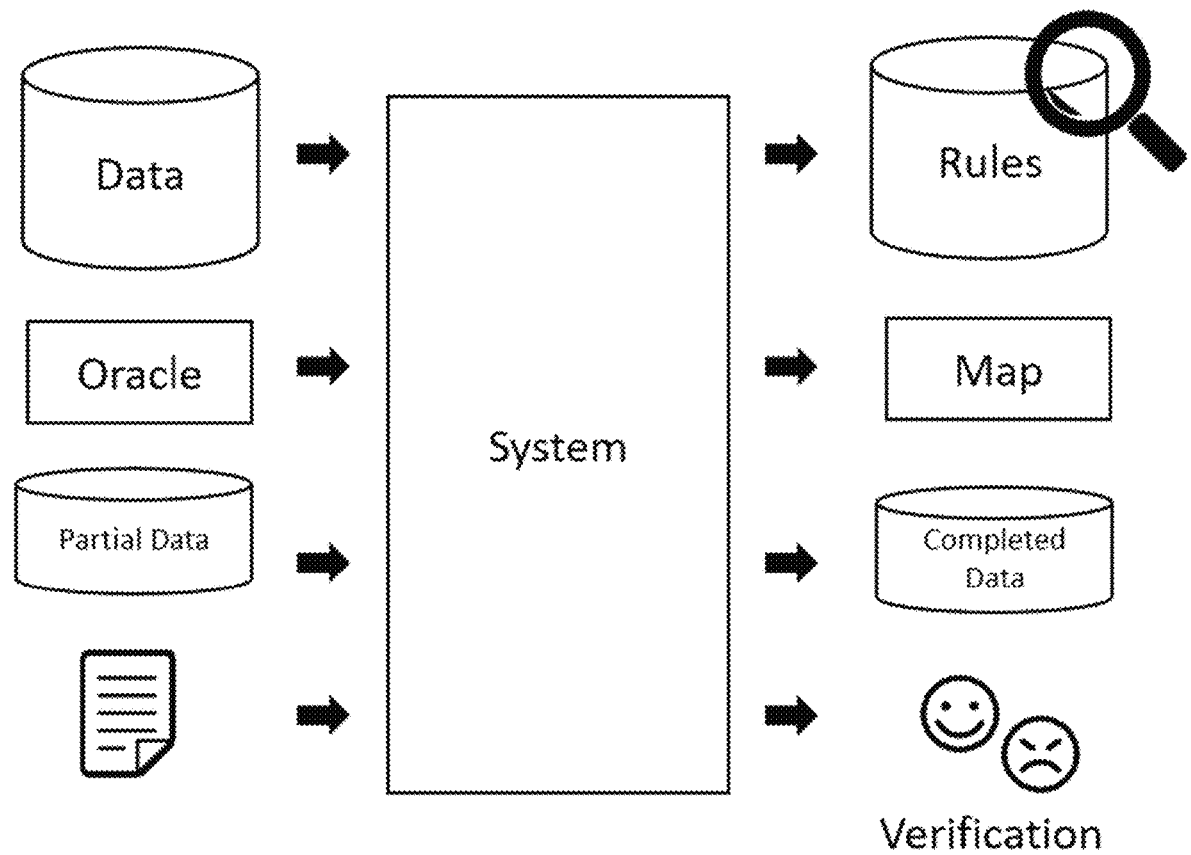
FIG. 18 illustrates general inputs and outputs of a system according to an embodiment.

FIG. 18 illustrates general inputs and outputs of a system for processing data according to embodiments. The system may receive as input data, partial data or graphs, as well as an Oracle trainer, or other trainer. As described herein, the data/graph(s) may be processed to map the topology of a graph into a vector and learn rules which may be used to verify a graph or data and/or complete missing data or graph elements.

Figure 25:
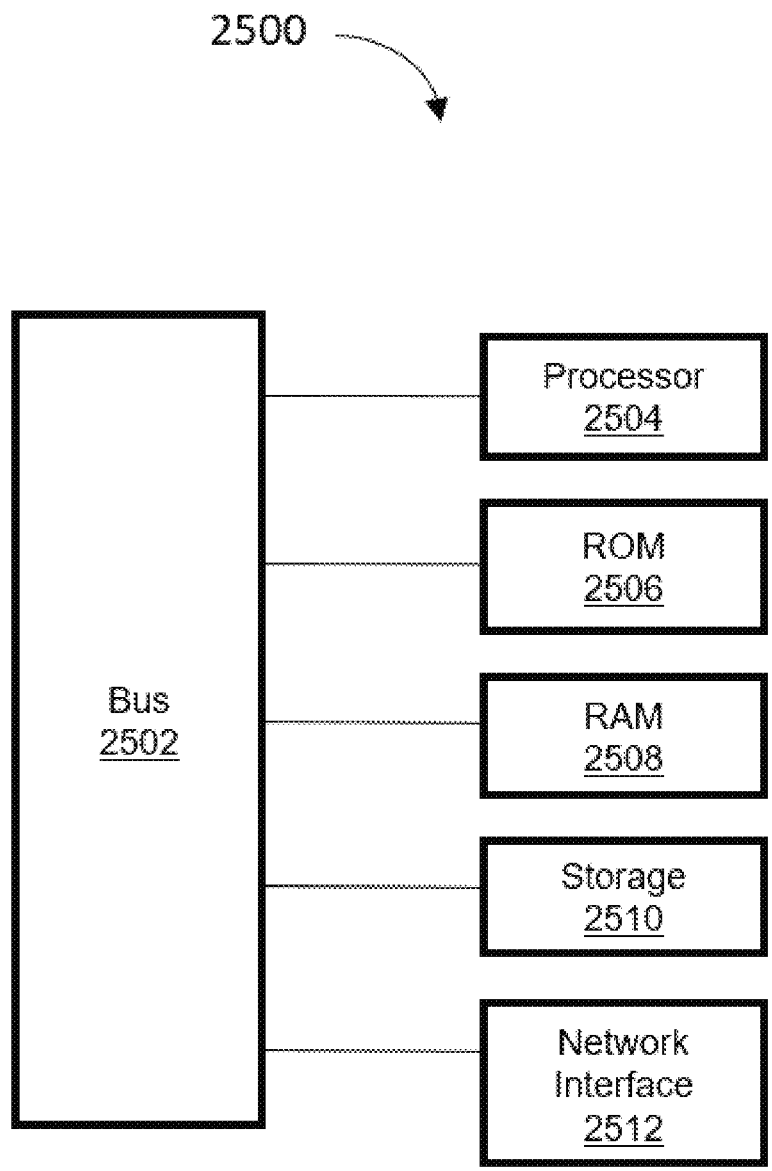
FIG. 25 shows an embodiment of a processing system according to the present disclosure.

Referring to FIG. 25, a processing system 2500 can include one or more processors 2502, memory 2504, one or more input/output devices 2506, one or more sensors 2508, one or more user interfaces 2510, and one or more actuators 2512. Processing system 2500 can be representative of each computing system disclosed herein.

Processors 2502 can include one or more distinct processors, each having one or more cores. Each of the distinct processors can have the same or different structure. Processors 2502 can include one or more central processing units (CPUs), one or more graphics processing units (GPUs), circuitry (e.g., application specific integrated circuits (ASICs)), digital signal processors (DSPs), and the like. Processors 2502 can be mounted to a common substrate or to multiple different substrates.

Processors 2502 are configured to perform a certain function, method, or operation (e.g., are configured to provide for performance of a function, method, or operation) at least when one of the one or more of the distinct processors is capable of performing operations embodying the function, method, or operation. Processors 2502 can perform operations embodying the function, method, or operation by, for example, executing code (e.g., interpreting scripts) stored on memory 2504 and/or trafficking data through one or more ASICs. Processors 2502, and thus processing system 2500, can be configured to perform, automatically, any and all functions, methods, and operations disclosed herein. Therefore, processing system 2500 can be configured to implement any of (e.g., all of) the protocols, devices, mechanisms, modules, systems, and methods described herein.

For example, when the present disclosure states that a method or device performs task "X" (or that task "X" is performed), such a statement should be understood to disclose that processing system 2500 can be configured to perform task "X". Processing system 2500 is configured to perform a function, method, or operation at least when processors 2502 are configured to do the same.

Memory 2504 can include volatile memory, non-volatile memory, and any other medium capable of storing data. Each of the volatile memory, non-volatile memory, and any other type of memory can include multiple different memory devices, located at multiple distinct locations and each having a different structure. Memory 2504 can include remotely hosted (e.g., cloud) storage.

Examples of memory 2504 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 2504.

Input-output devices 2506 can include any component for trafficking data such as ports, antennas (i.e., transceivers), printed conductive paths, and the like. Input-output devices 2506 can enable wired communication via USB®, DisplayPort®, HDMI®, Ethernet, and the like. Input-output devices 2506 can enable electronic, optical, magnetic, and holographic, communication with suitable memory 2506. Input-output devices 2506 can enable wireless communication via WiFi®, Bluetooth®, cellular (e.g., LTE®, CDMA®, GSM®, WiMax®, NFC®), GPS, and the like. Input-output devices 2506 can include wired and/or wireless communication pathways.

Sensors 2508 can capture physical measurements of environment and report the same to processors 2502. For example, as described above sensor may be provided on shelves in a retail setting in order to detect customer interactions with the goods. User interface 2510 can include displays, physical buttons, speakers, microphones, keyboards, and the like. Actuators 2512 can enable processors 2502 to control mechanical forces.

Processing system 2500 can be distributed. For example, some components of processing system 2500 can reside in a remote hosted network service (e.g., a cloud computing environment) while other components of processing system 2500 can reside in a local computing system. Processing system 2500 can have a modular design where certain modules include a plurality of the features/functions shown in FIG. 25. For example, I/O modules can include volatile memory and one or more processors. As another example, individual processor modules can include read-only-memory and/or local caches.

EXPERIMENTS

Graph classification experiments were performed on synthetic without node features and real world datasets with and without node features. For the graph classification tasks, the mean prediction accuracy was computed across all graphs in an unseen test set. In all experiments, the average result of three runs with three different random seeds to obtain more stable results is reported. To better understand the robustness of the models, the standard deviation (indicated by the ±symbol) is also reported. To evaluate the potential benefits of encoding the topology into a fixed-sized bit string as described above, graphs are filtered with a size larger than 15 and 20 nodes. As a consequence, the results are may not be directly comparable to prior works. Dataset details can be found in Table 1.

Architectures

Similar to prior works, a graph neural network with 2 convolutional layers with an optional dropout layer after each convolution is used. A mean pooling layer is used after the convolutional layers to aggregate the obtained node features into a single vector that represents the entire graph. The pooling is followed by an additional layer to map the obtained intermediate representation to the final output. In contrast to this approach, which outputs only a single binary label, the GNN generates two outputs for a binary classification task that indicate the probability of each class.

Three different versions of the present approach based were implemented on the fixed and learned graph representations. The first version, $GRN_{ASC}$ (adjacency string canonicalized) uses only the canonicalized adjacency string as graph representation. Second, a version that jointly learns the GRN and the GNN is used, which is denoted as $GRN_{GNN}$. Third, the architecture that uses a combination of both representations is denoted by $GRN_{ASC+GNN}$. To obtain a meaningful comparison with the reference model, the same GNN architecture as described above is used. Instead of using an additional layer to make the class predictions, the reasoning module is used.

TABLE 1

Dataset statistics

| Dataset | Train | Test | Num. nodes |
|---|---|---|---|
| NCI1 | 240 | 26 | up to 15 |
| PROTEINS | 360 | 40 | up to 20 |
| IMDB-BIN | 400 | 40 | up to 15 |

Hyperparameter Optimization

To perform a hyperparameter optimization, the datasets were split into training, validation, and test splits with sizes of 80%, 10%, and 10% of the dataset, respectively and report the result of the configuration with the best validation result for each run. For the GNN, a hidden size in {32, 64}, a learning rate in {0.01, 0.001}, and test a dropout probability in {0.0, 0.3} were considered, where a dropout probability of 0.0 means that no dropout is used. For the Sat-net, a learning rate in {0.1, 0.01} and a number of rules m and auxiliary variables aux in {32, 64} were considered. To limit the search space, only configurations with m=aux were considered. Adam optimizer is used to train all models.

representation of the node degree is a strong, hand-crafted feature for GNNs in many datasets. The results of this experiment can be found in Table 2.

The results show that the $GRN_{ASC}$ and $GRN_{GNN}$ are able to outperform the baseline approaches in the PROTEINS and the IMDB-BIN datasets. Interestingly, $GRN_{ASC}$ that does not use the node degree as feature performs best in PROTEINS, which suggests that the topology is highly informative in this dataset. In NCI1, several methods show a similar performance and $GRN_{ASC+GNN}$ does not perform well

TABLE 2

Prediction accuracy and standard deviation of three runs for real-world graphs without node features. Column 'Node Feature' indicates which alternative feature has been used as input for the message passing algorithm. Since GRN_ASC only uses the topology string, it does not need alternative node features.

| Model | Node Features | NCI1 | PROTEINS | IMDB-BIN |
|---|---|---|---|---|
| GNN | constant | 0.87 ± 0.02 | 0.63 ± 0.05 | 0.54 ± 0.09 |
| GNN | node degree | 0.86 ± 0.02 | 0.60 ± 0.07 | 0.64 ± 0.05 |
| $GRN_{ASC}$ | — | 0.87 ± 0.11 | 0.67 ± 0.10 | 0.61 ± 0.07 |
| $GRN_{GNN}$ | constant | 0.87 ± 0.02 | 0.61 ± 0.05 | 0.48 ± 0.00 |
| $GRN_{GNN}$ | node degree | 0.83 ± 0.02 | 0.61 ± 0.03 | 0.67 ± 0.05 |
| $GRN_{ASC+GNN}$ | constant | 0.83 ± 0.09 | 0.63 ± 0.13 | 0.63 ± 0.06 |
| $GRN_{ASC+GNN}$ | node degree | 0.80 ± 0.07 | 0.62 ± 0.08 | 0.62 ± 0.05 |

TABLE 3

Results for synthetic graphs with Random Graphs (RG). Prediction tasks: for connectivity,□ for square motif counting,☒ for 5 edges motif counting and Δ for triangle counting.

| Dataset | Erdos-Renyi RG | | | 3-Regular RG | | |
|---|---|---|---|---|---|---|
| Model | ●-● | ⌐ | ☒ | Δ | ⌐ | Δ |
| GNN | 0.70 | 0.51 | 0.53 | 0.57 | 0.63 | 0.59 |
| $GRN_{ASC}$ | 0.98 | 0.81 | 0.85 | 0.87 | 1.00 | 1.00 |

Synthetic Problems

To compare the expressiveness of GRN versus GNN, synthetic graph datasets were generated randomly generated with n nodes. Regular random graphs of fixed degree d (d-regular) and Erdos-Renyi with edge probability p were used. Prediction tasks considered included detecting the connectivity of the graph (●-●), detecting presence of motifs: triangles (Δ), squares (⌐) and 5-edges 4-nodes motif (☒). For 3-regular graphs $th_\Delta=2$, $th_⌐=3$, and $th_\Delta=6$, $th_⌐=6$, $th_☒=3$. As expected (see Table 3), GNN is not able to detect with accuracy the presence of specific motifs in the graph. The GNN shows more reasonable performance on the connectivity test, probably exploiting other correlated information. On the other hand, GRN exhibits superior performance, thus confirming that the use of the topological information is necessary if the prediction task involve information related to the topology of the graph.

Real-World Datasets without Node Features

Next, experiments were performed on real-world datasets without node features. To this end, the NCI1 and the PROTEINS datasets without node features were used. Furthermore, the IMDB-BIN dataset was used. Since message passing neural networks such as the GCN rely on node features for message passing, two different node feature alternatives were used. In the first version, all nodes were initialized with the same, constant value. In the second version, the feature vectors of all nodes were initialized with their node degree in a one-hot encoding. Using a one-hot Real-World Datasets with Node Features In the last experiment, the performance of different approaches in the NCI1, NCI109, and PROTEINS datasets with their original node features was evaluated. The results in Table 4 show that the baseline GNN performs best in the NCI1 and NCI109 datasets, closely followed by $GRN_{GNN}$. Additionally using the topology in the $GRN_{ASC+GNN}$ seems not to be beneficial in these two dataset. However, GRN ASC+GNN performs best in the PROTEINS dataset, which suggests that the model is able to leverage the information contained in the topology string. This observation confirms the result from Table 2, which also showed that the topology seems to be important in the PROTEINS dataset.

TABLE 4

Results for real-world graphs with node features

| Model | NCI1 | NCI109 | PROTEINS |
|---|---|---|---|
| GNN | 0.88 ± 0.04 | 0.83 ± 0.06 | 0.60 ± 0.04 |
| $GRN_{Gnn}$ | 0.87 ± 0.06 | 0.82 ± 0.02 | 0.62 ± 0.06 |
| $GRN_{ASC+GNN}$ | 0.86 ± 0.04 | 0.79 ± 0.06 | 0.65 ± 0.11 |

Additional Applications

The present embodiments are useful for any of a variety of applications including those described above, as well as the following applications and any similar applications:

Closed world description: consider the problem of learning the rule of a world described in a document.

Image's objects relationship: consider the problem of learning the valid configuration from object in images. Similar to the previous case, the image represents all possible true relationship among object in the image.

Graph Node properties: another example is to lean the properties of the nodes of a class of graph. For example each node has a limited output degree (number of edges, e.g. <2).

Figure 20:
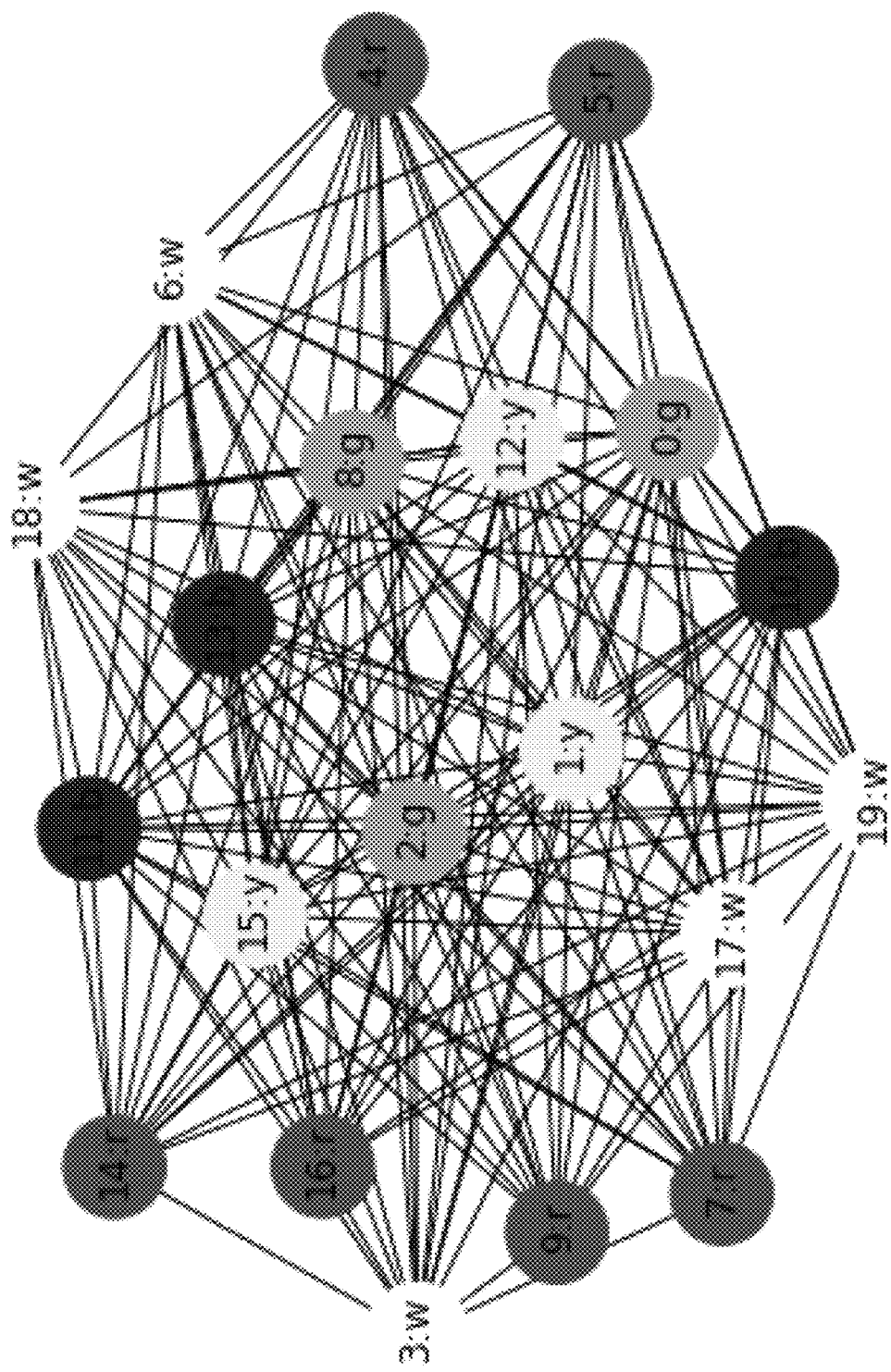
FIG. 20 illustrates a graph coloring according to an embodiment.
Figure 21:
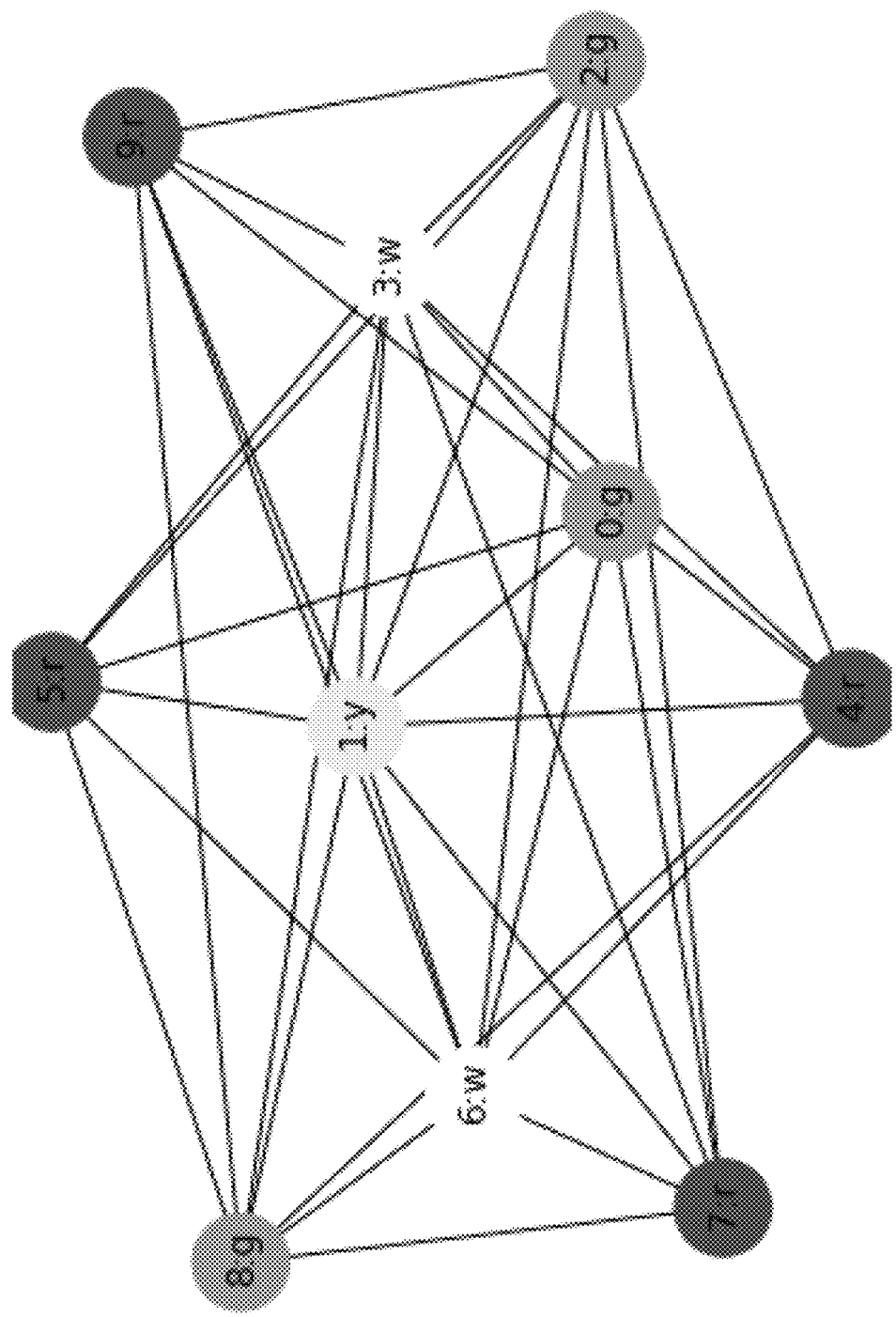
FIG. 21 illustrates a graph coloring according to an embodiment.

Graph Coloring: consider the problem of learning vertex coloring rules for a graph, where each graph's vertex is associated with a color, which is encoded as binary variable. A graph is valid if the colors respect the local rule for all vertices. See, e.g., FIG. 20 and FIG. 21.

Figure 22:
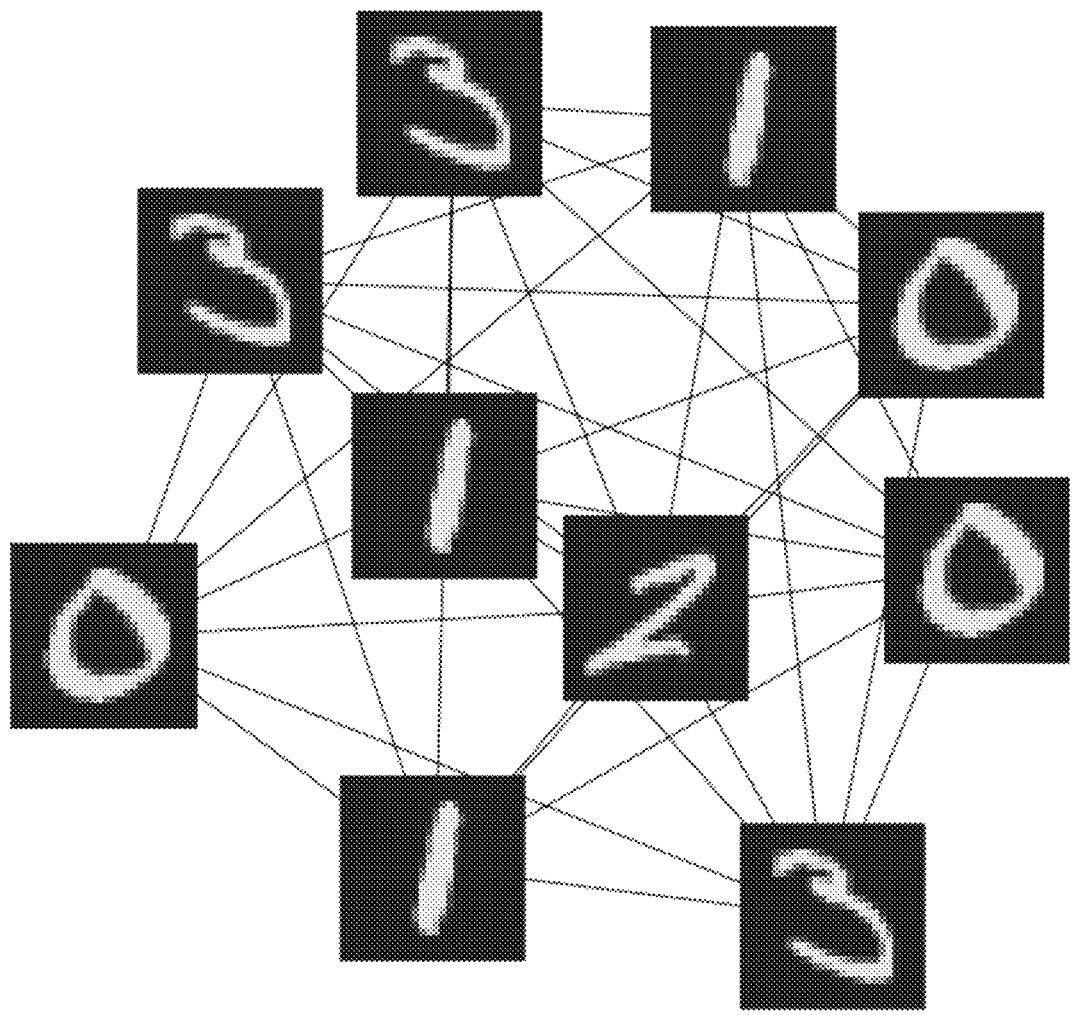
FIG. 22 illustrates a graph coloring over images from the Modified National Institute of Standards and Technology (MNIST) database according to an embodiment.

MNIST Graph Coloring: consider the problem of learning vertex coloring rules for a graph, when the node contain images. See, e.g., FIG. 22.

Figure 23:
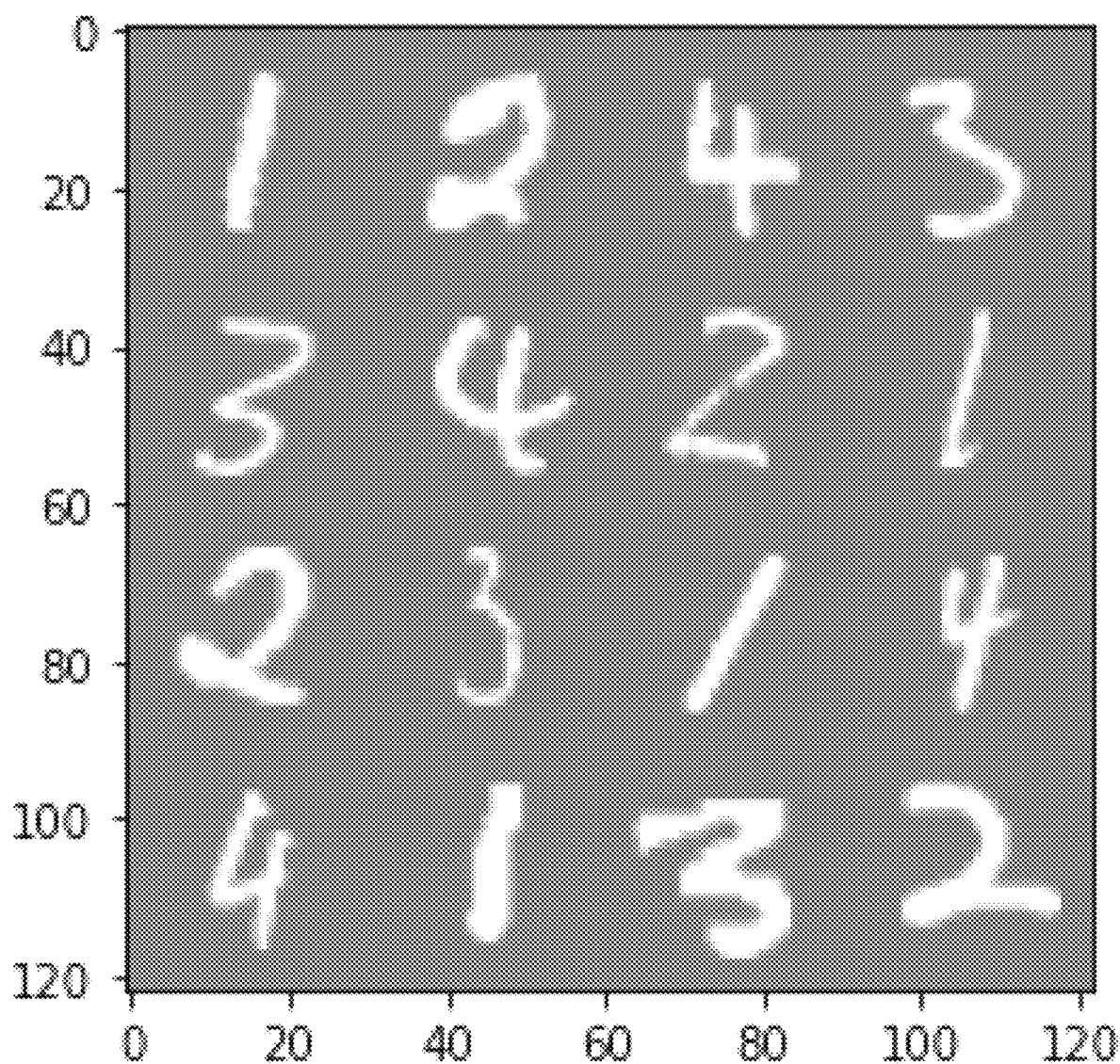
FIG. 23 illustrates MNIST Sudoku according to an embodiment.
Figure 24:
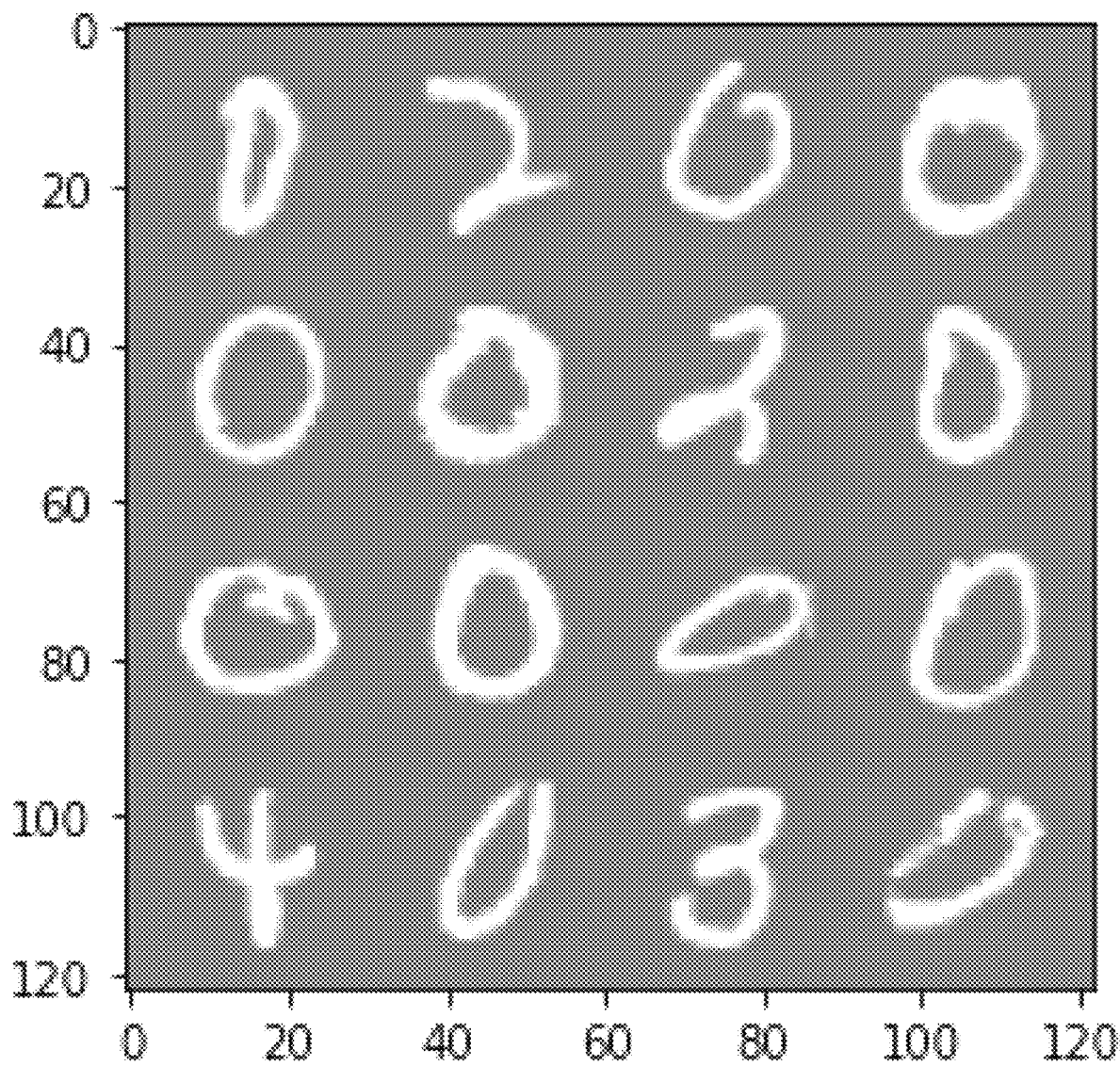
FIG. 24 illustrates MNIST Sudoku according to an embodiment.

MNIST sudoku on Graph: as an extension of the previous case, consider the problem of learning vertex sudoku rules for graph, when the node contain images of partial sudoku. See, e.g., FIG. 23 and FIG. 24.

Learning Chemistry: consider the problem of learning the logical rules that atoms need to satisfy when combining in forming molecules. For each atom, learn a discrete feature vector that represents the status of the atom. H2O,H3O.

Learning Biological relationships: consider the case where biological elements, such as protein and cells, interact. During this interaction different stable conditions may arise. By providing these stable conditions as training the rules of these interactions may be learned using the Graph-SAT as disclosed herein.

The following references are hereby incorporated by reference herein:
1. Wang, Po-Wei, Priya Donti, Bryan Wilder, and Zico Kolter, "Satnet: Bridging deep learning and logical reasoning using a differentiable satisfiability solver," In International Conference on Machine Learning, pp. 6545-6554. PMLR (2019).
2. Ferber, Aaron, Bryan Wilder, Bistra Dilkina, and Milind Tambe, "Mipaal: Mixed integer program as a layer," In Proceedings of the AAAI Conference on Artificial Intelligence, vol. 34, no. 02, pp. 1504-1511 (2020).

Priority provisional application 63/248,611, filed Sep. 27, 2021, entitled "LEARNING HUMAN-UNDERSTANDABLE LOGICAL RULES FROM DATA," includes an attachment entitled "GraphSAT—Learning Logic Rules on Graphs" that describes embodiments of the present invention, which is hereby incorporated by reference herein.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the present invention, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method of learning and applying a rule set from relational data, the method implemented in a processor connected to a memory, the method comprising:
receiving a graph representing relational data, wherein nodes represent elements of the graph, and edges represent relationships between nodes;
generating an intermediate representation of the graph by mapping features of the nodes and edges of the graph to an intermediate vector representation, wherein the intermediate vector representation contains binary values and/or probabilistic values;
learning logical rules that define the nodes and edges of the graph based on the intermediate vector representation r by:
defining a maximum satisfiability (MAX-SAT) problem for the graph; and
estimating a gradient around a solution of the MAX-SAT problem for the graph to produce the logical rules; and
applying the logical rules to a new graph.

2. The method according to claim 1, wherein receiving the graph includes receiving an input data set and building the graph from the input data set.

3. The method according to claim 2, wherein the input data set comprises text data, image data, video data, biological structure data or chemical structure data.

4. The method according to claim 1, wherein the new graph is a partial graph, and wherein the applying the logical rules to the new graph results in a completed graph, or wherein the new graph is a whole graph, and the applying the logical rules to the new graph results in a validity check that the new graph satisfies the logical rules or an extraction of information from the whole graph.

5. The method according to claim 1, wherein the MAX-SAT problem is associated with the entire graph, or wherein the MAX-SAT problem is associated with the nodes of the graph, or wherein the MAX-SAT problem is associated with the edges of the graph.

6. The method of claim 1, wherein the learning logical rules includes applying one or both of an Oracle training process to verify the logical rules or a consistency training process to verify consistency of the logical rules.

7. The method of claim 1, wherein the estimating the gradient around the solution of the MAX-SAT problem includes using a SAT solver or using semi-definitive problem (SDP) relaxation.

8. The method according to claim 1, wherein generating the intermediate representation of the graph is based on using one or more graph neural networks (GNNs).

9. The method according to claim 1, wherein the MAX-SAT problem is a version of a satisfiability (SAT) problem that looks for a maximum number of logical rules to be satisfied.

10. The method according to claim 1, wherein the logical rules are human-understandable rules that are obeyed by the nodes and the edges of the graph.

11. The method according to claim 1, wherein the graph is an undirected graph.

12. A computing device configured for learning and applying a rule set from relational data, the device comprising:
- one or more processors; and
- a memory storing instructions, wherein the instructions when executed by the one or more processors cause the network device to implement a method of learning and applying a rule set from relational data, the method comprising:
  - receiving a graph representing relational data, wherein nodes represent elements of the graph, and edges represent relationships between nodes;
  - generating an intermediate representation of the graph by mapping features of the nodes and edges of the graph to an intermediate vector representation, wherein the intermediate vector representation contains binary values and/or probabilistic values;
  - learning logical rules that define the nodes and edges of the graph based on the intermediate vector representation r by:
    - defining a maximum satisfiability (MAX-SAT) problem for the graph; and
    - estimating a gradient around a solution of the MAX-SAT problem for the graph to produce the logical rules; and
  - applying the logical rules to a new graph.

13. The device of claim 12, wherein the new graph is a partial graph, and wherein the applying the logical rules to the new graph results in completed graph, or wherein the new graph is a whole graph, and the applying the logical rules to the new graph results in a validity check that the new graph satisfies the logical rules or an extraction of information from the whole graph.

14. The device of claim 12, wherein the instructions for receiving the graph include instructions for receiving an input data set and building the graph from the input data set.

15. The device of claim 14, wherein the input data set comprises text data, image data, video data, biological structure data or chemical structure data.

16. The device of claim 12, wherein the MAX-SAT problem is associated with the entire graph, or wherein the MAX-SAT problem is associated with the nodes of the graph, or wherein the MAX-SAT problem is associated with the edges of the graph.

17. The device of claim 12, wherein the instructions for learning logical rules include instructions for applying one or both of an Oracle training process to verify the logical rules or a consistency training process to verify consistency of the logical rules.

18. The device of claim 12, wherein the instructions for estimating the gradient around the solution of the MAX-SAT problem include instructions for using a SAT solver or using semi-definitive problem (SDP) relaxation.

19. A tangible, non-transitory computer-readable medium having instructions thereon which, upon being executed by one or more processors, alone or in combination, provide for execution of method of learning and applying a rule set from relational data, the method comprising:
- receiving a graph representing relational data, wherein nodes represent elements of the graph, and edges represent relationships between nodes;
- generating an intermediate representation of the graph by mapping features of the nodes and edges of the graph to an intermediate vector representation, wherein the intermediate vector representation contains binary values and/or probabilistic values;
- learning logical rules that define the nodes and edges of the graph based on the intermediate vector representation r by:
  - defining a maximum satisfiability (MAX-SAT) problem for the graph; and
  - estimating a gradient around a solution of the MAX-SAT problem for the graph to produce the logical rules; and
- applying the logical rules to a new graph.

* * * * *